United States Patent
Ichino et al.

(10) Patent No.: US 10,577,437 B2
(45) Date of Patent: Mar. 3, 2020

(54) HYDROGENATED BLOCK COPOLYMER AND POLYPROPYLENE-BASED RESIN COMPOSITION USING THE SAME AND MOLDED ARTICLE THEREOF

(71) Applicant: Asahi Kasei Kabushiki Kaisha, Tokyo (JP)

(72) Inventors: Hiroyuki Ichino, Tokyo (JP); Yasuhiro Kusanose, Tokyo (JP); Masashi Yamamoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 53 days.

(21) Appl. No.: 15/754,334

(22) PCT Filed: Aug. 24, 2016

(86) PCT No.: PCT/JP2016/074718
§ 371 (c)(1),
(2) Date: Feb. 22, 2018

(87) PCT Pub. No.: WO2017/033987
PCT Pub. Date: Mar. 2, 2017

(65) Prior Publication Data
US 2018/0237556 A1    Aug. 23, 2018

(30) Foreign Application Priority Data
Aug. 24, 2015 (JP) ................ 2015-165172

(51) Int. Cl.
| | |
|---|---|
| *C08F 8/04* | (2006.01) |
| *C08J 5/18* | (2006.01) |
| *C08L 23/12* | (2006.01) |
| *C08L 23/14* | (2006.01) |
| *C08L 53/02* | (2006.01) |

(52) U.S. Cl.
CPC .......... *C08F 8/04* (2013.01); *C08J 5/18* (2013.01); *C08L 23/12* (2013.01); *C08L 23/14* (2013.01); *C08L 53/025* (2013.01); *C08J 2323/12* (2013.01); *C08J 2323/14* (2013.01); *C08J 2353/02* (2013.01); *C08J 2423/14* (2013.01); *C08J 2453/02* (2013.01); *C08L 2201/10* (2013.01); *C08L 2205/06* (2013.01)

(58) Field of Classification Search
CPC ... C08L 53/025; C08F 297/044; C08F 297/04
See application file for complete search history.

(56) References Cited

U.S. PATENT DOCUMENTS

| | | | |
|---|---|---|---|
| 6,455,635 | B1 | 9/2002 | Yonezawa et al. |
| 2008/0023215 | A1* | 1/2008 | Uehara .................. C08F 255/02 |
| | | | 174/137 B |
| 2013/0209787 | A1 | 8/2013 | Eguchi et al. |
| 2015/0344684 | A1 | 12/2015 | Kusanose et al. |
| 2015/0353669 | A1 | 12/2015 | Araki et al. |
| 2016/0243799 | A1 | 8/2016 | Oshima et al. |

FOREIGN PATENT DOCUMENTS

| | | |
|---|---|---|
| DE | 112009005525 B4 | 12/2017 |
| EP | 1002813 A1 | 5/2000 |
| JP | 05-170844 * | 7/1993 |
| JP | H06-306127 A | 11/1994 |
| JP | H09-291181 A | 11/1997 |
| JP | H11-130828 A | 5/1999 |
| JP | 2000-135762 A | 5/2000 |
| JP | 2001-240636 A | 9/2001 |
| JP | 2002-371136 A | 12/2002 |
| JP | 2008-069337 A | 3/2008 |
| RU | 2559317 C2 | 8/2015 |
| WO | 2000/015681 A1 | 3/2000 |
| WO | 2014/002984 A1 | 1/2014 |
| WO | 2014/112411 A | 7/2014 |
| WO | 2015/046251 A1 | 4/2015 |
| WO | 2017/188190 A1 | 11/2017 |

OTHER PUBLICATIONS

Shibata et al., electronic translation of JP 05-170844, Jul. 1993.*
Shibata et al., CAPLUS AN 1993:672628, abstracting JP 05-170844, Jul. 1993.*
International Preliminary Report on Patentability and Written Opinion issued in corresponding International Patent Application No. PCT/JP2016/074718 dated Feb. 27, 2018.
Supplementary European Search Report issued in corresponding European Patent Application No. 16839334.6 dated Jul. 26, 2018.
International Search Report issued in corresponding International Patent Application No. PCT/JP2016/074718 dated Oct. 11, 2016.

* cited by examiner

Primary Examiner — Jeffrey C Mullis
(74) Attorney, Agent, or Firm — Morgan, Lewis & Bockius LLP

(57) ABSTRACT

The present invention provides a hydrogenated block copolymer: having a polymer block (S) containing an aromatic vinyl compound unit as a main constituent; and a polymer block (B) containing a conjugated diene compound unit as a main constituent, in a molecule.

14 Claims, No Drawings

HYDROGENATED BLOCK COPOLYMER AND POLYPROPYLENE-BASED RESIN COMPOSITION USING THE SAME AND MOLDED ARTICLE THEREOF

TECHNICAL FIELD

The present invention relates to a hydrogenated block copolymer and a polypropylene-based resin composition using the same and a molded article thereof.

BACKGROUND ART

A polypropylene-based resin composition is generally excellent in chemical resistance and mechanical properties and thus used in a wide variety of fields including packaging materials, mechanical parts and car parts. Recently, in order to satisfy the needs for overcoming environmental problems, development of halogen-free transparent polymer materials has been accelerated. Particularly in the fields including sheets, films and tubes, a polypropylene-based resin composition is used and a request for making a polypropylene-based resin composition soft and/or transparent to meet various uses has appeared.

Patent Literature 1 discloses "a hydrogenated block copolymer which comprises at least two polymer blocks A each mainly comprising an aromatic vinyl hydrocarbon compound monomer unit and at least two hydrogenated polymer blocks B each mainly comprising a butadiene monomer unit, at least 90% of the olefinically unsaturated double bonds in said polymer block mainly comprising a butadiene monomer unit before hydrogenation having been hydrogenated, wherein at least one of the block at the terminal of the hydrogenated block copolymer is the polymer block B, wherein the proportion of the terminal polymer blocks B in the hydrogenated block copolymer is at least 0.1 wt % but less than 9.1 wt %, wherein the proportion of the aromatic vinyl hydrocarbon compound in the hydrogenated block copolymer exceeds 10 wt % but less than 25 wt %, wherein the 1,2-bond content of the polymer blocks mainly comprising a butadiene monomer unit before hydrogenation is, on average, at least 62 mol % but less than 99 mol %, and wherein the difference $\Delta Tc$ (Tc1−Tc2) between the crystallization initiating temperature (Tc1) of the isotactic homopolypropylene and the crystallization initiating temperature (Tc2) of a mixture thereof with 20% by weight of the hydrogenated block copolymer is at least 1.5° C.".

Patent Literatures 2 and 3 disclose hydrogenated block copolymers comprising a styrene block and a butadiene block.

CITATION LIST

Patent Literatures

Patent Literature 1: International Publication No. WO2000/015681
Patent Literature 2: Japanese Patent Laid-Open No. H11-130828
Patent Literature 3: International Publication No. WO2015/046251

SUMMARY OF INVENTION

Technical Problem

Molded articles of polypropylene-based resin compositions for use in the food packaging field, garment packaging field and medical fields (e.g., infusion bags and infusion tubes) are required to have properties such as heat sealability, flexibility, low anisotropy, transparency, low stickiness and shock resistance, and further required to have a favorable balance among the individual properties.

Polypropylene molded articles using block copolymers disclosed in Patent Literatures 1 to 3, for example, molded articles such as sheets, films and bags, were found to have room for improvement in balance among heat sealability, flexibility, low anisotropy, transparency, low stickiness and shock resistance.

An object of the present invention is to provide a hydrogenated block copolymer, which can give excellent performance, i.e., an excellent balance among heat sealability, flexibility, low anisotropy, transparency, low stickiness and shock resistance, to a molded article of a polypropylene-based resin composition; and to provide a polypropylene-based resin composition using the hydrogenated block copolymer and a molded article of the composition.

Solution to Problem

The present invention is as follows.

[1]
A hydrogenated block copolymer comprising: a polymer block (S) comprising an aromatic vinyl compound unit as a main constituent; and a polymer block (B) comprising a conjugated diene compound unit as a main constituent, in a molecule, wherein a content of the polymer block (S) is 5 to 20% by mass and a content of the polymer block (B) is 80 to 95% by mass, in the hydrogenated block copolymer, the polymer block (B) comprises a polymer block (B1) and a polymer block (B2); an amount of a vinyl bond of the polymer block (B1) before hydrogenation is 30 to 60 mol % and an amount of a vinyl bond of the polymer block (B2) before hydrogenation is more than 60 to 100 mol %, a content of the polymer block (B1) is 5 to 60% by mass and a content of the polymer block (B2) is 30 to 85% by mass, in the hydrogenated block copolymer, a content of a structure represented by following Formula (1) in the hydrogenated block copolymer is 40 to 100% by mass:

(S-B)                                         Formula (1)

[wherein, S represents the polymer block (S) and B represents the polymer block (B)], and a hydrogenation rate of the hydrogenated block copolymer is 70 mol % or more.

[2]
The hydrogenated block copolymer according to [1], wherein a content of the structure represented by Formula (1) is 40 to 90% by mass, and the hydrogenated block copolymer further comprises any one of structures represented by following formulae (2) to (4):

$(S-B)_n-X$                                Formula (2)

(S-B-S)                                     Formula (3)

(S-B-S-B3)                            Formula (4)

[wherein, S represents the polymer block (S) and B represents the polymer block (B); S and B in Formulae (1) to (4) may be the same or different, respectively; n in Formula (2) represents an integer of 2 or more; X represents a coupling residue; B3 in Formula (4) represents a polymer block (B3) comprising a conjugated diene compound unit as a main constituent, which is different from the polymer block (B); an amount of a vinyl bond of the polymer block (B3) before hydrogenation is 30 to 100 mol %; and a content of the polymer block (B3) in the hydrogenated block copolymer is 0.1 to 10% by mass].

[3]

The hydrogenated block copolymer according to [1] or [2], wherein the structure represented by Formula (1) has the polymer block (S), the polymer block (B1) and the polymer block (B2) in this order.

[4]

The hydrogenated block copolymer according to any of [1] to [3], wherein the amount of the vinyl bond of the polymer block (B1) before hydrogenation is 40 to 60 mol %.

[5]

The hydrogenated block copolymer according to any of [1] to [4], wherein the content of the structure represented by Formula (1) is 50 to 85% by mass.

[6]

A polypropylene-based resin composition comprising: 10 to 90% by mass of the hydrogenated block copolymer according to any of [1] to [5]; and 10 to 90% by mass of a polypropylene-based resin.

[7]

The polypropylene-based resin composition according to [6], wherein the polypropylene-based resin is a random polypropylene.

[8]

A molded article comprising the polypropylene-based resin composition according to [6] or [7].

[9]

A sheet comprising the polypropylene-based resin composition according to [6] or [7].

Advantageous Effects of Invention

According to the present invention, it is possible to provide a hydrogenated block copolymer, which can give excellent performance, i.e., an excellent balance among heat sealability, flexibility, low anisotropy, transparency, low stickiness and shock resistance, to a molded article of a polypropylene-based resin composition; and to provide a polypropylene-based resin composition using the hydrogenated block copolymer and a molded article of the composition.

DESCRIPTION OF EMBODIMENTS

Embodiments of the present invention (hereinafter referred to as "present embodiments") will be more specifically described below. The present embodiments below are examples for explaining the present invention and should not be construed as limiting the present invention to the following content. The present invention can be appropriately modified and carried out within the scope of the invention.

<Hydrogenated Block Copolymer (a)>

The hydrogenated block copolymer of the present embodiment is a hydrogenated block copolymer comprising: a polymer block (S) comprising an aromatic vinyl compound unit as a main constituent; and a polymer block (B) comprising a conjugated diene compound unit as a main constituent, in a molecule, wherein the content of the polymer block (S) is 5 to 20% by mass and the content of the polymer block (B) is 80 to 95% by mass, in the hydrogenated block copolymer, the polymer block (B) comprises a polymer block (B1) and a polymer block (B2); the amount of the vinyl bond of the polymer block (B1) before hydrogenation is 30 to 60 mol % and the amount of the vinyl bond of the polymer block (B2) before hydrogenation is more than 60 to 100 mol %, the content of the polymer block (B1) is 5 to 60% by mass and the content of the polymer block (B2) is 30 to 85% by mass, in the hydrogenated block copolymer, the content of the structure represented by following Formula (1) in the hydrogenated block copolymer is 40 to 100% by mass:

(S-B)　　　　　　　　　　　　　　　　　　　Formula (1)

[wherein, S represents the polymer block (S) and B represents the polymer block (B)], and the hydrogenation rate of the hydrogenated block copolymer is 70 mol % or more.

In the present embodiment, the phrase "comprising . . . as a main constituent" means that the monomer unit of interest is comprised in an amount of 91% by mass or more in the polymer block of interest.

In the polymer block (S), the content of the aromatic vinyl compound unit is 91% by mass or more, and in the polymer block (B), the content of the conjugated diene compound unit is 91% by mass or more.

In view of properties such as heat sealability, flexibility, low anisotropy, transparency, low stickiness and shock resistance of the molded article of the polypropylene-based resin composition to be obtained, the content of the aromatic vinyl compound unit in the polymer block (S) comprising an aromatic vinyl compound unit as a main constituent is preferably 92% by mass or more, more preferably 93% by mass or more, further preferably 95% by mass or more and further more preferably 100% by mass.

From the same point of view as above, the content of the conjugated diene compound in the polymer block (B) comprising a conjugated diene compound unit as a main constituent is preferably 92% by mass or more, more preferably 93% by mass or more, further preferably 95% by mass or more and further more preferably 100% by mass. The contents of the conjugated diene compound unit in the polymer block (B1) comprising a conjugated diene compound unit as a main constituent and the polymer block (B2) comprising a conjugated diene compound unit as a main constituent are, each independently, preferably 91% by mass or more, more preferably 92% by mass or more, further preferably 93% by mass or more, further more preferably 95% by mass or more and still further preferably 100% by mass.

In the polymer block (S) comprising an aromatic vinyl compound unit as a main constituent, a conjugated diene compound unit may be comprised. In the polymer block (B) comprising a conjugated diene compound unit as a main constituent, the polymer block (B1) comprising a conjugated diene compound unit as a main constituent and the polymer block (B2) comprising a conjugated diene compound unit as a main constituent may each comprise an aromatic vinyl compound unit.

In the present embodiment, the content of the polymer block (S) in the hydrogenated block copolymer is 5 to 20% by mass in the hydrogenated block copolymer. The content of the polymer block (S) is preferably 6 to 18% by mass, more preferably 7 to 17% by mass and further preferably 8 to 15% by mass in the hydrogenated block copolymer, in view of productivity and properties such as heat sealability, flexibility, low anisotropy, transparency, low stickiness and shock resistance of the molded article of the polypropylene-based resin composition to be obtained.

In the present embodiment, the aromatic vinyl compound unit is a unit comprising an aromatic vinyl compound. Examples of the aromatic vinyl compound include, but are not particularly limited to, styrene, α-methylstyrene, p-methylstyrene, divinylbenzene, 1,1-diphenylethylene, N,N-dimethyl-p-aminoethylstyrene and N,N-diethyl-p-aminoethylstyrene.

Of them, styrene, α-methylstyrene and 4-methylstyrene are preferable in view of availability and productivity, and styrene is more preferable.

The polymer block (S) may comprise a single type of aromatic vinyl compound unit or two types or more of aromatic vinyl compound units.

In the present embodiment, the content of the polymer block (B) in the hydrogenated block copolymer is 80 to 95% by mass in the hydrogenated block copolymer. The content of the polymer block (B) is preferably 82 to 94% by mass, more preferably 83 to 93% by mass and further preferably 85 to 92% by mass in the hydrogenated block copolymer, in view of productivity and properties such as heat sealability, flexibility, low anisotropy, transparency, low stickiness and shock resistance of the molded article of the polypropylene-based resin composition to be obtained.

The polymer block (B) of the present embodiment comprises a polymer block (B1) and a polymer block (B2). In the polymer block (B1), the amount of the vinyl bond before hydrogenation is 30 to 60 mol %, and in the polymer block (B2) the amount of the vinyl bond before hydrogenation is more than 60 to 100 mol %.

The "amount of the vinyl bond before hydrogenation" in the polymer block (B1) and the polymer block (B2) refers to the amount (mol %) of a 1,2-bond based on the total amount of a 1,4-bond (cis and trans) and the 1,2-bond derived from a conjugated diene compound integrated in the block copolymer before hydrogenation (note that, if the conjugated diene compound is integrated in the polymer through a 3,4-bond, the amount of the 1,2-bond refers to the total amount of the 1,2-bond and the 3,4-bond).

The amount of the vinyl bond of the polymer block (B1) before hydrogenation is 30 to 60 mol %. The amount of the vinyl bond is preferably 35 to 58 mol %, more preferably 40 to 57 mol % and further preferably 45 to 55 mol %, in view of shock resistance of the molded article of the polypropylene-based resin composition to be obtained.

The amount of the vinyl bond of the polymer block (B2) before hydrogenation is more than 60 to 100 mol %. The amount of the vinyl bond is preferably 65 to 95 mol %, more preferably 68 to 90 mol % and further preferably 73 to 85 mol %, in view of productivity and heat sealability, flexibility, transparency, low stickiness and low anisotropy of the molded article of the polypropylene-based resin composition to be obtained.

In the present embodiment, the conjugated diene compound unit is a unit comprising a conjugated diene compound. Examples of the conjugated diene compound include a diolefin having a pair of conjugated double bonds.

Examples of the conjugated diene compound include, but are not particularly limited to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene and farnesene.

Of them, 1,3-butadiene and isoprene can be used as a general diolefin.

The polymer block (B), the polymer block (B1) and the polymer block (B2) each may comprise a single type of conjugated diene compound unit or two types or more of conjugated diene compound units.

In the present embodiment, the averaged amount of the vinyl bond of the polymer block (B) before hydrogenation is preferably 40 to 98 mol %. The "averaged amount of the vinyl bond of the polymer block (B) before hydrogenation" refers to an average value of the amount of the vinyl bond of the polymer block (B1) before hydrogenation and the amount of the vinyl bond of the polymer block (B2) before hydrogenation, in consideration of the mass ratio of the polymer block (B1) and the polymer block (B2).

More specifically, the averaged amount of the vinyl bond of the polymer block (B) before hydrogenation can be obtained as follows:

Amount of vinyl bond of polymer block (B1) before hydrogenation×(Content of polymer block (B1)/Sum of contents of polymer block (B1) and (B2))+Amount of vinyl bond of polymer block (B2) before hydrogenation×(Content of polymer block (B2)/Sum of contents of polymer block (B1) and (B2)).

The averaged amount of the vinyl bond of the polymer block (B) before hydrogenation is more preferably 45 to 95 mol %, further preferably 48 to 91 mol % and further more preferably 54 to 85 mol %, in view of productivity and properties such as flexibility, transparency, low stickiness and shock resistance of the molded article of the polypropylene-based resin composition to be obtained.

In the present embodiment, the content of the polymer block (B1) is 5 to 60% by mass in the hydrogenated block copolymer. The content of the polymer block (B1) is preferably 10 to 50% by mass and more preferably 15 to 45% by mass in the hydrogenated block copolymer, in view of heat sealability, flexibility, low anisotropy, transparency, low stickiness and shock resistance of the molded article of the polypropylene-based resin composition to be obtained.

In the present embodiment, the content of the polymer block (B2) is 30 to 85% by mass in the hydrogenated block copolymer. The content of the polymer block (B2) is preferably 35 to 75% by mass and more preferably 40 to 70% by mass in the hydrogenated block copolymer, in view of heat sealability, flexibility, anisotropy, transparency and shock resistance of the molded article of the polypropylene-based resin composition to be obtained.

The order of the polymer block (B1) and the polymer block (B2) comprised in the polymer block (B) is not particularly limited. In view of productivity, the hydrogenated block copolymer has preferably the polymer block (S) comprising an aromatic vinyl compound unit as a main constituent, the polymer block (B1) comprising a conjugated diene compound unit as a main constituent and the polymer block (B2) comprising a conjugated diene compound unit as a main constituent in this order.

In the present embodiment, the content of the structure represented by following Formula (1) in the hydrogenated block copolymer is 40 to 100% by mass, in view of heat sealability, flexibility, low anisotropy, transparency and low stickiness of the molded article of the polypropylene-based resin composition to be obtained.

(S-B)  Formula (1)

The content of the structure represented by Formula (1) in the hydrogenated block copolymer is preferably 43 to 95% by mass, more preferably 46 to 90% by mass and further preferably 50 to 85% by mass, in view of properties such as heat sealability, flexibility, low anisotropy, transparency, low stickiness and shock resistance of the molded article of the polypropylene-based resin composition to be obtained.

If the hydrogenated block copolymers are coupled, a mixture comprising, in addition to the diblock having the structure represented by Formula (1), hydrogenated block copolymers linked in a linear, branched or radial manner via a coupling agent, in an arbitrary ratio, may be used. In this case, based on the following expression, the coupling ratio can be obtained by gel permeation chromatographic (hereinafter also referred to as "GPC") measurement.

Coupling ratio (% by mass)=[(Total peak area)−(Peak area derived from structure represented by Formula (1))]/(Total peak area)×100

The type and amount of the coupling agent can be selected in accordance with a desired weight average molecular weight of the hydrogenated block copolymer.

For example, if the coupling ratio of the hydrogenated block copolymer is 0 to 60% by mass, the content of the structure represented by Formula (1) in the hydrogenated block copolymer is 40 to 100% by mass.

In the present embodiment, the hydrogenated block copolymer may comprise, in addition to the structure represented by Formula (1), any one of the structures represented by following formulae (2) to (4), in view of heat sealability, flexibility, low anisotropy, transparency and low stickiness of the molded article of the polypropylene-based resin composition to be obtained.

(S-B)$_n$-X            Formula (2)

(S-B-S)            Formula (3)

(S-B-S-B3)            Formula (4)

[wherein, S represents the polymer block (S) and B represents the polymer block (B); S and B in Formulae (1) to (4) may be the same or different, respectively; n in Formula (2) represents an integer of 2 or more; X represents a coupling residue; B3 in Formula (4) represents a polymer block (B3) comprising a conjugated diene compound unit as a main constituent, which is different from the polymer block (B); the amount of the vinyl bond of the polymer block (B3) before hydrogenation is 30 to 100 mol %; and the content of the polymer block (B3) in the hydrogenated block copolymer is 0.1 to 10% by mass].

In the present embodiment, if any one of the structures represented by Formulae (2) to (4) is comprised, the content of the structure represented by Formula (1) in the hydrogenated block copolymer is preferably 40 to 90% by mass, more preferably 43 to 95% by mass, further preferably 46 to 90% by mass and further more preferably 50 to 85% by mass, in view of properties such as heat sealability, flexibility, low anisotropy, transparency, low stickiness and shock resistance of the molded article of the polypropylene-based resin composition to be obtained.

In Formula (2), n is preferably 2 to 4, more preferably 2 or 3 and further preferably 2, in view of properties such as heat sealability, flexibility, low anisotropy, transparency, low stickiness and shock resistance of the molded article of the polypropylene-based resin composition to be obtained.

In the present embodiment, the hydrogenation rate of the hydrogenated block copolymer is 70 mol % or more.

In the present embodiment, the "hydrogenation rate of the hydrogenated block copolymer" refers to the hydrogenation rate (mol %) of all conjugated diene compound units comprised in the hydrogenated block copolymer.

By defining the hydrogenation rate of the hydrogenated block copolymer as 70 mol % or more, the dissolution parameter value of the polymer block (B) comes closer to that of the polypropylene-based resin, resulting in the dispersibility of the hydrogenated block copolymer in the polypropylene-based resin composition being improved. Because of this, the flexibility and transparency of the molded article of the polypropylene-based resin composition to be obtained become satisfactory.

The hydrogenation rate of the hydrogenated block copolymer is preferably 85 mol % or more, more preferably 90 mol % or more and further preferably 95 mol % or more, in view of productivity and properties such as flexibility, low anisotropy, transparency, low stickiness and shock resistance of the molded article of the polypropylene-based resin composition to be obtained.

The hydrogenation rate of the hydrogenated block copolymer can be controlled, for example, by an amount of a catalyst for the hydrogenation. The hydrogenation speed can be controlled, for example, by an amount of a catalyst, an amount of hydrogen feed, pressure and temperature during the hydrogenation.

The melt flow rate (MFR; based on ISO 1133) of the hydrogenated block copolymer is preferably 0.1 to 25.0 g/10 minutes, more preferably 0.5 to 20.0 g/10 minutes, further preferably 1.0 to 15.0 g/10 minutes and further more preferably 1.5 to 10.0 g/10 or less, in view of properties such as processability, flexibility, low anisotropy, transparency and low stickiness of the molded article of the polypropylene-based resin composition to be obtained.

The weight average molecular weight (Mw) of the hydrogenated block copolymer of the present embodiment is not particularly limited; however Mw is, for example, 70,000 to 500,000, preferably 90,000 to 400,000, more preferably 100,000 to 300,000, further preferably 130,000 to 300,000, further more preferably 140,000 to 280,000, and further preferably 150,000 to 250,000, in view of properties such as heat sealability, flexibility, low anisotropy, transparency, low stickiness and shock resistance of the molded article of the polypropylene-based resin composition to be obtained.

The molecular weight distribution of a single peak of the hydrogenated block copolymer of the present embodiment, measured by GPC, is preferably 1.30 or less, more preferably 1.20 or less, further preferably 1.15 or less and further more preferably 1.10 or less.

The weight average molecular weight (Mw) of the hydrogenated block copolymer is a weight average molecular weight (Mw), which is the molecular weight of a peak in the chromatogram (obtained by GPC measurement), which is obtained based on the calibration curve obtained by measuring a commercially available standard polystyrene (the calibration curve is prepared by using the peak molecular weight of the standard polystyrene).

The molecular weight distribution of the hydrogenated block copolymer can be obtained, similarly to the weight average molecular weight (Mw), based on measurement by GPC. The molecular weight distribution is the ratio of the weight average molecular weight (Mw) and the number average molecular weight (Mn).

<Method for Producing Hydrogenated Block Copolymer>

The hydrogenated block copolymer of the present embodiment can be produced by performing polymerization in an organic solvent using an organoalkali metal compound as a polymerization initiator, performing, if desired, a coupling reaction, and then performing a hydrogenation reaction.

As a polymerization process, a batch polymerization or a continuous polymerization, or a combination of them may be employed.

In order to obtain a hydrogenated block copolymer having high strength with a narrow molecular weight distribution, a batch polymerization process is preferable.

The polymerization temperature is generally 0 to 150° C., preferably 20 to 120° C. and more preferably 40 to 100° C.

The polymerization time varies depending upon the desired polymer; however the polymerization time generally falls within 24 hours and preferably 0.1 to 10 hours. In order to obtain a hydrogenated block copolymer having high strength with a narrow molecular weight distribution, the polymerization time is more preferably 0.5 to 3 hours.

The atmosphere of the polymerization system is not particularly limited, as long as it has a pressure sufficient to keep nitrogen and a solvent in a liquid phase. It is preferable that the polymerization system does not comprise impurities such as water, oxygen and carbon dioxide gas which inactivate a polymerization initiator and a living polymer.

Examples of the organic solvent include, but are not particularly limited to, aliphatic hydrocarbons such as n-butane, iso-butane, n-pentane, n-hexane, n-heptane and n-octane; alicyclic hydrocarbons such as cyclohexane, cycloheptane and methylcyclopentane; and aromatic hydrocarbons such as benzene, xylene, toluene and ethylbenzene.

As the organoalkali metal compound serving as a polymerization initiator, an organic lithium compound is preferable (note that, compounds equivalent to an alkali metal alkoxide and an alkali metal compound are excluded from the organoalkali metal compound).

Examples of the organic lithium compound include an organic monolithium compound, an organic dilithium compound and an organic polylithium compound.

Examples of the organic lithium compound include, but are not particularly limited to, ethyl lithium, n-propyl lithium, isopropyl lithium, n-butyl lithium, sec-butyl lithium, t-butyl lithium, phenyl lithium, hexamethylene dilithium, butadienyl lithium and isopropenyl dilithium.

Of them, n-butyl lithium and sec-butyl lithium are preferable in view of polymerization activity.

The use amount of the organoalkali metal compound serving as a polymerization initiator varies depending upon the molecular weight of a desired hydrogenated block copolymer; however, the use amount generally falls within the range of 0.01 to 0.5 phm (parts by mass per 100 parts by mass of monomer), preferably 0.03 to 0.3 phm and more preferably 0.05 to 0.15 phm.

The amounts of the individual vinyl bonds in the hydrogenated block copolymer before hydrogenation can be controlled by using a Lewis base (e.g., a compound having an ether structure and an amine structure in a molecule) as a vinylating agent. Desired amounts of the individual vinyl bonds before hydrogenation can be obtained by controlling the use amount of the vinylating agent.

By adding a vinylating agent and an alkali metal alkoxide (described later) separately in two or more conditions, polymer blocks different in an amount of the vinyl bond (before hydrogenation) can be produced in the polymer block (B).

Examples of the vinylating agent include an ether compound and a tertiary amine compound.

The vinylating agents may be used singly or in combination of two or more.

Examples of the ether compound include a linear ether compound and a cyclic ether compound. As the ether compound, a compound having two or more oxygen atoms may be employed.

Examples of the linear ether compound include, but are not particularly limited to, dimethyl ether, diethyl ether, diphenyl ether, dialkyl ether compounds of ethylene glycol such as ethylene glycol dimethyl ether, ethylene glycol diethyl ether and ethylene glycol dibutyl ether; and dialkyl ether compounds of diethylene glycol such as diethylene glycol dimethyl ether, diethylene glycol diethyl ether and diethylene glycol dibutyl ether.

Examples of the cyclic ether compound include, but are not particularly limited to, tetrahydrofuran, dioxane, 2,5-dimethyloxolane, 2,2,5,5-tetramethyloxolane, 2,2-bis(2-oxolanyl)propane and furfuryl alcohol.

Examples of the tertiary amine compound include, but are not particularly limited to, pyridine, N,N,N',N'-tetramethylethylenediamine, tributylamine, tetramethylpropane diamine, 1,2-dipiperidinoethane and bis[2-(N,N-dimethylamino)ethyl]ether.

The ether compounds may be used singly or in combination of two or more.

As the tertiary amine compound, a compound having two amines is preferable. Of them, a compound having a symmetry structure in a molecule is preferable. As the a tertiary amine compound having such a structure, N,N,N',N'-tetramethylethylenediamine, bis[2-(N,N-dimethylamino)ethyl]ether and 1,2-dipiperidinoethane are preferable.

The tertiary amine compounds may be used singly or in combination of two or more.

In the present embodiment, copolymerization of a hydrogenated block copolymer may be performed in the co-presence of a vinylating agent, an organic lithium compound as a polymerization initiator and an alkali metal alkoxide.

The alkali metal alkoxide refers to a compound represented by general Formula MOR (wherein M represents an alkali metal and R represents an alkyl group).

As the alkali metal of the alkali metal alkoxide, sodium or potassium is preferable in order to obtain a high vinyl-bond content, a narrow molecular weight distribution, a high polymerization rate and a high blocking rate.

Examples of the alkali metal alkoxide include, but are not particularly limited to, a sodium alkoxide, lithium alkoxide and potassium alkoxide having an alkyl group of 2 to 12 carbon atoms, preferably a sodium alkoxide and a potassium alkoxide having an alkyl group of 3 to 6 carbon atoms, more preferably sodium-t-butoxide, sodium-t-pentoxide, potassium-t-butoxide and potassium-t-pentoxide.

Of them, sodium-t-butoxide and sodium-t-pentoxide, which is a sodium alkoxide, is preferable.

In the polymerization step for the hydrogenated block copolymer of the present embodiment, if polymerization is performed in the co-presence of a vinylating agent, an organic lithium compound and an alkali metal alkoxide, it is preferable that the molar ratio of the vinylating agent to the organic lithium compound (vinylating agent/organic lithium compound) is set to be 0.2 to 3.0 and the molar ratio of the alkali metal alkoxide and the organic lithium compound (alkali metal alkoxide/organic lithium compound) is set to be 0.01 to 0.3.

The molar ratio of vinylating agent/organic lithium compound is preferably set to be 0.2 or more in order to obtain a high vinyl-bond content and a high polymerization rate; and 3.0 or less in order to obtain a narrow molecular weight distribution and a high hydrogenation activity.

The molar ratio of alkali metal alkoxide/organic lithium compound is preferably set to be 0.01 or more in order to obtain a high vinyl-bond content, a high polymerization rate and a high blocking rate; and 0.3 or less in order to obtain a narrow molecular weight distribution and a high hydrogenation activity.

By setting the molar ratio of vinylating agent/organic lithium compound and the molar ratio of alkali metal alkoxide/organic lithium compound to fall within the above ranges, the polymerization rate is improved, the amount of the vinyl bond of a desired hydrogenated block copolymer before hydrogenation can be increased; at the same time, the molecular weight distribution can be narrowed and further, the blocking rate tends to be improved. As a result, properties such as low anisotropy, flexibility, transparency, smoothness and low stickiness of the molded article of the polypropylene-based resin composition tend to be improved.

The molar ratio of vinylating agent/organic lithium compound is preferably 0.8 or more in order to obtain a high vinyl-bond content and a high polymerization rate, and preferably 2.5 or less and more preferably 1.0 to 2.0 in order to obtain a narrow molecular weight distribution and a high hydrogenation activity.

The molar ratio of alkali metal alkoxide/organic lithium compound is preferably 0.02 or more in order to obtain a high vinyl-bond content, a high polymerization rate and a high blocking rate, and preferably 0.2 or less, more preferably 0.03 to 0.1 and further preferably 0.03 to 0.08 in order to obtain a narrow molecular weight distribution and a high hydrogenation activity.

The molar ratio of alkali metal alkoxide/vinylating agent is preferably 0.010 or more in order to obtain a high vinyl-bond content, a high polymerization rate and a high blocking rate, and preferably 0.100 or less in order to obtain a narrow molecular weight distribution and a high hydrogenation activity.

The molar ratio of alkali metal alkoxide/vinylating agent is more preferably 0.012 to 0.080, further preferably 0.015 to 0.060 and further more preferably 0.015 to 0.050.

As a method for producing blocks in the polymer block (B), which are different in an amount of the vinyl bond (before hydrogenation), an inactivator against a vinylating agent can be used.

Examples of the inactivator include an alkyl metal compound. Examples of the alkyl metal compound include an alkyl aluminum, zinc and magnesium having 1 to 20 carbon atoms per one alkyl substituent.

The alkyl metal compounds may be used singly or in combination of two or more.

After completion of a polymerization reaction, a calculated amount of a coupling agent is added and a coupling reaction of the block polymer, which is obtained by the polymerization reaction, is performed.

The coupling reaction conditions vary depending upon the polymer to be obtained. The reaction temperature is generally 0° C. to 150° C. and the reaction time generally falls within 24 hours.

The coupling agent for use in the production of the hydrogenated block copolymer of the present embodiment is not particularly limited and a coupling agent known in the art can be used.

Examples of a bifunctional coupling agent include an alkoxysilane compound such as trimethoxysilane, triethoxysilane, tetramethoxysilane, tetraethoxysilane, dimethyldimethoxysilane, diethyldimethoxysilane, dichlorodimethoxysilane, dichlorodiethoxysilane, trichloromethoxysilane and trichloroethoxysilane; a dihalogen compound such as dichloroethane, dibromoethane, dimethyldichlorosilane and dimethyldibromosilane; and an acid ester such as methyl benzoate, ethyl benzoate, phenyl benzoate and phthalate.

Examples of a multifunctional (trifunctional or more) coupling agent include trimethoxysilane hydride, methyltrimethoxysilane, octyltrimethoxysilane, isobutyltrimethoxysilane, tetrakis 2-butoxyethylorthosilicate, tetrabutoxyorthosilicate and polyalcohols of trivalent or more; a multivalent epoxy compound such as epoxidized soybean oil, diglycidyl bisphenol A and 1,3-bis(N,N-diglycidylaminomethyl)cyclohexane; a silicon halide compound represented by general Formula $R_{4-n}SiX_n$ (wherein R represents a hydrocarbon group having 1 to 20 carbon atoms; X represents a halogen atom; and n represents an integer of 3 to 4) such as methylsilyl trichloride, t-butylsilyl trichloride, silicon tetrachloride, silicon bromide compounds obtained by replacing chlorine atoms of these compounds with bromine atoms; and tin halide compounds represented by general Formula $R_{4-x}SnX_n$ (wherein R represents a hydrocarbon group having 1 to 20 carbon atoms; X represents a halogen atom; and n represents an integer of 3 to 4) such as methyltin trichloride, t-butyltin trichloride and tin tetrachloride. As the coupling agent, e.g., dimethyl carbonate and diethyl carbonate may be used.

As the coupling agent, a bifunctional coupling agent is preferable in view of properties such as low anisotropy, flexibility, low anisotropy, transparency, low stickiness and shock resistance of the molded article of the polypropylene-based resin composition to be obtained, and dimethyldimethoxysilane and ethyl benzoate are suitable.

In the present embodiment, the hydrogenation method is not particularly limited. For example, by hydrogenating a block copolymer (before hydrogenation), which is obtained above through a coupling reaction, in the presence of a hydrogenation catalyst while supplying hydrogen, a double bond residue of a conjugated diene compound unit is hydrogenated to obtain a hydrogenated block copolymer. The hydrogenation reaction can be carried out in any of a batch process, a continuous process, or a combination of them.

The hydrogenation rate can be controlled, for example, by the amount of a hydrogenation catalyst. The hydrogenation speed can be controlled, for example, by the amount of a hydrogenation catalyst, the amount of hydrogen feed, pressure and/or temperature.

Examples of the hydrogenation catalyst to be used in production of the hydrogenated block copolymer of the present embodiment include, but are not particularly limited to, a titanocene compound, a reducing organometallic compound and a mixture of a titanocene compound and a reducing organometallic compound.

Examples of the titanocene compound include compounds described, for example, in Japanese Patent Laid-Open No. H8-109219. Examples thereof include, but are not particularly limited to, a compound having at least one ligand having a cyclopentadienyl skeleton such as bis(cyclopentadienyl)titanium dichloride, monopentamethylcyclopentanedienyl titanium trichloride, an indenyl skeleton or a fluorenyl skeleton. The cyclopentadienyl skeleton, indenyl skeleton or fluorenyl skeleton may be substituted or unsubstituted.

Examples of the reducing organometallic compound include, but are not particularly limited to, an organoalkali metal compound such as organolithium, an organomagnesium compound, an organoaluminum compound, an organoboron compound and an organozinc compound.

The reaction temperature of the hydrogenation reaction is generally 0 to 200° C. and preferably 30 to 150° C.

The hydrogen pressure of the hydrogenation reaction generally falls within the range of 0.1 to 15 MPa, preferably 0.2 to 10 MPa and more preferably 0.3 to 5 MPa.

The reaction time of the hydrogenation reaction is generally 3 minutes to 10 hours and preferably 10 minutes to 5 hours.

Pellets of a hydrogenated block copolymer can be produced by pelletizing the hydrogenated block copolymer.

Examples of a pelletization method include a method of extruding a hydrogenated block copolymer from a single screw or twin screw extruder to obtain a strand-shaped material and cutting the strand-shaped material in water by a rotary blade disposed in the front surface of a die; a method of extruding a hydrogenated block copolymer from a single screw or twin screw extruder to obtain a strand-shaped material, cooling the strand-shaped material with water or air and cutting the material by a strand cutter; and a method of melt blending a hydrogenated block copolymer by an open roll or Banbury mixer, molding the melt by a roll into the form of sheet, cutting the sheet into strips and cutting the strips into cubic pellets by a pelletizer.

The size and shape of the pellet molded articles of the hydrogenated block copolymer are not particularly limited.

With the hydrogenated block copolymer, if necessary, with the pellets thereof, an antiblocking agent for pellets is preferably blended for preventing blocking of pellets.

Examples of the antiblocking agent for pellets include, but are not particularly limited to, calcium stearate, magnesium stearate, zinc stearate, polyethylene, polypropylene, ethylene bis stearylamide, talc and amorphous silica.

In view of transparency of the polypropylene-based resin composition and the molded article of the polypropylene-based resin composition to be obtained, calcium stearate, polyethylene and polypropylene are preferable.

The content of the antiblocking agent for pellets based on the hydrogenated block copolymer is preferably 500 to 6000 ppm and more preferably 1000 to 5000 ppm.

The antiblocking agent for pellets blended is preferably attached to the surface of pellets and may be integrated within the pellets to some extent.

<Polypropylene-Based Resin Composition>

The polypropylene-based resin composition of the present embodiment comprises 10 to 90% by mass of the hydrogenated block copolymer (a) of the present embodiment and 10 to 90% by mass of the polypropylene-based resin (b), based on the total amount (100% by mass) of the hydrogenated block copolymer (a) of the present embodiment and the polypropylene-based resin (b).

In view of low anisotropy and low stickiness of the molded article of the polypropylene-based resin composition to be obtained, the content of the hydrogenated block copolymer (a) in the polypropylene-based resin composition is 90% by mass or less. In view of properties such as heat sealability, flexibility, transparency and shock resistance of the molded article of the polypropylene-based resin composition to be obtained, the content of the hydrogenated block copolymer (a) in the polypropylene-based resin composition is 10% by mass or more.

In view of properties such as heat sealability, flexibility, low anisotropy, transparency, low stickiness and shock resistance of the molded article of the polypropylene-based resin composition, the content of the hydrogenated block copolymer (a) is preferably 5 to 60% by mass, more preferably 10 to 50% by mass and further preferably 20 to 40% by mass; and, the content of the polypropylene-based resin (b) is preferably 40 to 95% by mass, more preferably 50 to 90% by mass and further preferably 60 to 80% by mass.

Examples of the polypropylene-based resin include a random polypropylene, a homopolypropylene and a block polypropylene.

Of them, a random polypropylene is preferable.

The polypropylene-based resins may be used singly or in combination of two or more.

The random polypropylene is a polymer obtained by copolymerization of propylene and a monomer except propylene and more specifically refers to a polymer formed by incorporating a monomer except propylene into a propylene chain at random; in other words, the monomer except propylene does not substantially make a continuous chain.

The random polypropylene is not particularly limited as long as the content of a propylene unit is less than 98% by mass. Examples thereof include a propylene-ethylene random copolymer and a random copolymer of propylene and α-olefin of 4 to 20 carbon atoms.

If a propylene-ethylene random copolymer or a random copolymer of propylene and α-olefin of 4 to 20 carbon atoms is used as the random polypropylene, the flexibility, transparency and shock resistance of the molded article of the polypropylene-based resin composition tend to be more satisfactory.

Of the random polypropylenes, a propylene-ethylene random copolymer or a random copolymer of propylene and α-olefin of 4 to 12 carbon atoms is preferable (as the random polypropylene), in view of the properties such as heat sealability, flexibility, low anisotropy, transparency, low stickiness and shock resistance of the molded article of the polypropylene-based resin composition; and a propylene-ethylene random copolymer, a propylene-1-butene random copolymer and a propylene-ethylene-1-butene ternary random copolymer are more preferable.

Examples of the α-olefin of 4 to 20 carbon atoms include, but are not particularly limited to, 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene and 1-eicosene. As the α-olefin, α-olefin of 4 to 12 carbon atoms is preferable, and 1-butene, 3-methyl-1-butene, 1-hexene and 4-methyl-1-pentene are more preferable.

α-Olefins may be used singly or in combination of two or more. Furthermore, an ethylene and α-olefin of 4 to 20 carbon atoms may be used in combination.

The content of an ethylene unit or an α-olefin unit in the random polypropylene is preferably more than 2% by mass and less than 40% by mass and the content of a propylene unit is preferably more than 60% by mass and less than 98% by mass.

The content of the ethylene unit or α-olefin unit is more preferably more than 2% by mass and 30% by mass or less, further preferably 2.5 to 25% by mass and further more preferably 3 to 20% by mass.

The content of the propylene unit is more preferably 70% by mass or more and less than 98% by mass, further preferably 75 to 97.5% by mass and further more preferably 80 to 97% by mass.

The content of a propylene unit, the content of an ethylene unit and the content of an α-olefin unit, in a random polypropylene, can be measured by a carbon nuclear magnetic resonance ($^{13}$C-NMR) method.

The melt flow rate (MFR; 230° C., based on ISO 1133) of a random polypropylene is preferably 1 to 30 g/10 minutes, more preferably 1 to 25 g/10 minutes, further preferably 2 to 20 g/10 minutes and further more preferably 3 to 15 g/10 minutes in view of processability and low stickiness of the polypropylene-based resin composition to be obtained.

In the polypropylene-based resin composition of the present embodiment, other additives may be used in combination depending upon the required performance.

Examples of the additives include, but are not particularly limited to, a flame retardant, a stabilizer, a coloring agent, a pigment, an antioxidant, an antistatic agent, a dispersant, a flow enhancer, a release agent such as a metal stearate, silicone oil, a mineral oil-based softening agent, a synthetic resin-based softening agent, a copper inhibitor, a crosslinking agent and a nucleating agent.

<Method for Producing Polypropylene-Based Resin Composition>

The polypropylene-based resin composition of the present embodiment can be produced, for example, by a method of dry blending a hydrogenated block copolymer (a), a polypropylene-based resin (b) and other components to be optionally added, in accordance with the composition ratio thereof and a preparation method with an apparatus used for mixing conventional polymer substances.

Examples of the mixing apparatus to be used for production of a polypropylene-based resin composition include, but are not particularly limited to, kneading apparatuses such as a Banbury mixer, Labo Plastomill, a single screw extruder and a twin screw extruder. A polypropylene-based resin composition is preferably produced by a melt-blending method using a single screw or a twin screw extruder in view of productivity and (satisfactory) kneadability.

The melting temperature during kneading can be appropriately set and generally falls within the range of 130 to 300° C. and preferably falls within the range of 150 to 250° C.

<Molded Article>

The molded article of the present embodiment comprises the polypropylene-based resin composition of the present embodiment.

Examples of the molded article include a sheet, a film, a bag, a tube, a molded article for medical use and a packaging material.

Examples of the molded article for medical use include medical films, medical bags and medical infusion tubes. Examples of the packaging material include food packaging materials and garment packaging materials.

Generally, a sheet-shaped molded article having a thickness of 0.005 mm or more and less than 0.2 mm is called as a film; whereas a sheet-shaped molded article having a thickness of 0.2 mm or more and 50 mm or less is called as a sheet.

In the present embodiment, the "sheet-shaped molded article" and "sheet" are used as terms including the film and sheet defined above.

The thickness of the sheet of the present embodiment is not particularly limited; however, the thickness is preferably 0.005 mm to 0.5 mm and more preferably 0.01 mm to 0.3 mm, in view of properties such as moldability/processability, flexibility and low anisotropy of the molded article of the polypropylene-based resin composition.

In the present embodiment, a method for producing a sheet-shaped molded article is not particularly limited.

As the method for producing a sheet-shaped molded article, for example, an extrusion molding method such as a T-die method and an inflation method can be employed. As the inflation method, e.g., a conventional air-cooling inflation molding method, an air-cooling two-step inflation molding method, a high-speed inflation molding method and a water-cooling inflation molding method can be employed.

Also, a blow molding method such as a direct blow molding method and an injection blow molding method and a press molding method can be employed.

Of them, a T-die method and an inflation method are preferable, since it is excellent in bubble stability and suppression of drawdown.

The sheet-shaped molded article of the present embodiment may be a single layer sheet; however, the sheet-shaped molded article may be laminated in combination with other polymers to form a multilayer sheet within the scope of the present invention.

Examples of the other polymers include an olefin polymer such as polypropylene, polyethylene, an ethylene-propylene copolymer rubber (EPM) and an ethylene/propylene/non-conjugated diene copolymer rubber (EPDM); a polyester polymer such as a polyester elastomer, a polyethylene terephthalate and a polybutylene terephthalate; a polyamide resin such as polyamide 6, polyamide 6.6, polyamide 6.10, polyamide 11, polyamide 12 and polyamide 6.12; an acrylic resin such as methyl polyacrylate and polymethyl methacrylate; a polyoxymethylene resin such as a polyoxymethylene homopolymer and a polyoxymethylene copolymer; a styrene resin such as a styrene homopolymer, an acrylonitrile-styrene resin and an acrylonitrile-butadiene-styrene resin; a polycarbonate resin; a styrene elastomer such as a styrene-butadiene copolymer rubber, a styrene-isoprene copolymer rubber and hydrogenated products or denatured products of these; a natural rubber; a synthetic isoprene rubber and a liquid polyisoprene rubber and hydrogenated products or denatured products of these; a chloroprene rubber; an acrylic rubber; a butyl rubber; an acrylonitrile-butadiene rubber; an epichlorohydrin rubber; a silicone rubber; a fluoro rubber; a chlorosulfonated polyethylene; a urethane rubber; a polyurethane elastomer; a polyamide elastomer; a polyester elastomer; and a soft vinyl chloride resin.

These other polymers may be used singly or as a blend of two or more and used as a single layer or a multilayer constituted of layers different in type.

In laminating other polymer layers, a coextrusion molding method such as a multilayer T-die method, a multilayer inflation method and an extrusion lamination method; a conventional method for molding a multilayer-sheet or film such as wet lamination, dry lamination and press molding; multilayer injection blow such as co-injection blow; and a blow molding method such as multilayer direct blow, can be employed.

The multilayer laminate molded may be used as it is (not stretched state) or may be uniaxially or biaxially stretched and put in use.

The sheet-shaped molded article of the present embodiment is excellent in heat sealability, flexibility, low anisotropy, transparency, low stickiness and shock resistance and can be applied to any use without limitation. Taking advantage of this property, the sheet-shaped molded article can be suitably used in a wide range of applications.

Examples of suitable applications include packaging of garments; packaging of foods; packaging of miscellaneous daily goods; packaging of industrial materials; rubber products, laminates of e.g., resin products and leather goods; elastic tapes for use in e.g., disposable diapers; industrial goods such as dicing films; protect films for protecting building materials and steel plates; base materials for adhesive films; sheet products such as trays for meat/fresh fish, fruit and vegetable packs and frozen food containers; uses in home appliances such as a TV set, a stereo and a vacuum cleaner; uses for automotive interior and exterior parts such as bumper parts, body panels and side seals; road paving materials; waterproof sheets; water-shielding sheets; civil engineering packing; daily goods; leisure goods; toys; industrial supplies; furniture supplies; stationary products such as writing utensils, clear pockets, holders and spines of files; and medical supplies such as infusion bags.

Of them, the sheet-shaped molded article of the present embodiment, which has an advantage of balance among properties such as heat sealability, flexibility, low anisotropy, transparency, low stickiness and shock resistance, can be particularly suitably used in a molded article for medical use such as medical films, medical infusion bags and medical tubes and packaging materials such as food packaging materials and garment packaging materials.

A bag refers to a pouch-shaped molded article which can be molded from the sheet-shaped molded article. Examples of the bag include food packaging bags, garment packaging bags and medical bags. Examples of the medical bag include medical infusion bags and medicinal agent packaging bags.

EXAMPLES

The present embodiments will be more specifically described by way of Examples; however, the embodiments are not limited to these Examples. In Examples and Comparative Examples, a hydrogenated block copolymer was prepared by the method that will be described below, and a polypropylene-based resin composition and a molded article of the composition were produced, and then, physical properties thereof were compared. At this time, the properties of hydrogenated block copolymers and the physical properties of molded articles of the polypropylene-based resin compositions were determined as follows.

<Measurement Methods>

1) Content of all Aromatic Vinyl Compound Units in Hydrogenated Block Copolymer (Hereinafter Referred to as the "Styrene Content")

Using the block copolymer before hydrogenation, measurement was performed in accordance with a proton nuclear magnetic resonance ($^1$H-NMR) method. As a measuring apparatus, JNM-LA400 (manufactured by JEOL) was used. As a solvent, deuterated chloroform was used. The concentration of a sample was 50 mg/mL. The observation frequency was 400 MHz. Tetramethylsilane was used as chemical shift referencing. The pulse delay was set at 2.904 seconds; the number of scans at 64 times and a pulse width at 45° and measurement was made at a temperature of 26° C.

The styrene content was computationally obtained based on the total integrated value of signals from aromatic styrene at 6.2 to 7.5 ppm in the spectrum.

2) Amount of Vinyl Bond of Hydrogenated Block Copolymer

Using the block copolymer before hydrogenation, measurement was performed in accordance with proton nuclear magnetic resonance ($^1$H-NMR) method. The measurement conditions and processing of measured data were the same as in Section 1).

The amount of the vinyl bond was obtained by computationally obtaining an integrated value per 1H of each bond form of a 1,4-bond and a 1,2-bond based on the integrated value of signals derived from these bonds and comparing the 1,4-bond and the 1,2-bond (this is a case of butadiene. In the case of isoprene, 3,4-bond is employed).

3) Hydrogenation Rate of Hydrogenated Block Copolymer

Using a hydrogenated block copolymer, measurement was performed in accordance with proton nuclear magnetic resonance ($^1$H-NMR). The measurement conditions and processing of measured data were the same as in Section 1). The hydrogenation rate was obtained by computationally obtaining the integrated values of a signal derived from a residual double bond at 4.5 to 5.5 ppm and a signal derived from a hydrogenated conjugated diene and comparing the two integrated values.

4) Content of Structure Represented by Formula (1) in Hydrogenated Block Copolymer The content of the structure represented by Formula (1) in a hydrogenated block copolymer was obtained by performing GPC measurement (LC-10, manufactured by Shimadzu Corporation) using a column: TSKgelGMHXL (4.6 mm ID×30 cm, 2 columns) and a solvent: tetrahydrofuran (THF), and calculating the ratio of the area corresponding to Formula (1) based on the total peak area.

5) Melt Flow Rate (Hereinafter Referred to as "MFR")

The MFR values of a hydrogenated block copolymer and a polypropylene-based resin were measured in accordance with ISO 1133 at a temperature of 230° C. and a load of 2.16 Kg.

6) Heat Sealability of Sheet-Shaped Molded Article

Two sheets of the sheet-shaped molded article having a thickness of about 250 μm, which were obtained in each of Examples and Comparative Examples, were laminated. Heat was then applied to one of the surfaces of the resultant structure by a heat sealer (TP-701-B, manufactured by Tester Sangyo Co., Ltd., sealing temperature: 160° C., sealing time: 5 seconds, actual pressure: 0.2 MPa) to seal them with heat. After the obtained samples each were allowed to stand still at 23° C. for 24 hours or more, a strip having a width of 15 mm was cut out in the direction perpendicular to the sealing width direction and cut into test pieces of 10 mm (length)×15 mm (width) having the seal part. Subsequently, the seal part of the test piece was peeled at an angle of 180° by a tension tester (TGE-500N, MINEBEA CO., LTD.,) at a rate of 200 mm/minutes. In this manner, heat seal strength (N/15 mm) per 15 mm in width was measured and used as a reference for heat sealability. Based on the heat seal strength thus obtained, evaluation was made in accordance with the following criteria.

5: Heat seal strength was 25 N/15 mm or more
4: Heat seal strength was 20 N/15 mm or more and less than 25 N/15 mm
3: Heat seal strength was 10 N/15 mm or more and less than 20 N/15 mm
2: Heat seal strength was 5 N/15 mm or more and less than 10 N/15 mm
1: Heat seal strength was less than 5 N/15 mm 7) Flexibility of Sheet-Shaped Molded Article The sheet-shaped molded articles having a thickness of about 250 μm and obtained in Examples and Comparative Examples were punched in accordance with JIS K6251 to obtain test pieces (No. JIS 5). The tensile elastic modulus (MPa) was measured at a tension rate of 200 mm/min and used as a reference for flexibility. Based on the tensile elastic moduli obtained, evaluation was made in accordance with the following criteria.

5: Tensile elastic modulus was less than 400 MPa
4: Tensile elastic modulus was 400 MPa or more and less than 500 MPa
3: Tensile elastic modulus was 500 MPa or more and less than 600 MPa
2: Tensile elastic modulus was 600 MPa or more and less than 800 MPa
1: Tensile elastic modulus was 800 MPa or more 8) Anisotropy of Sheet-Shaped Molded Article The sheet-shaped molded articles having a thickness of 250 μm and obtained in Examples and Comparative Examples were punched to obtain dumbbell samples (No. JIS 5). Using the samples, the tensile elastic moduli (MPa) in the machine direction (MD) and the transverse direction (TD) perpendicular to MD, were measured in accordance with JIS K6251 by a tension tester (MINEBEA CO., LTD., Tg-5 kN) at a tension rate of 200 mm/min. Based on the tensile elastic modulus ratios (MD/TD) thus obtained, anisotropy was evaluated with the following criteria.

5: MD/TD value fell within the range of 0.95 to 1.05
4: MD/TD value fell within the range of 0.92 to 1.08 (except the range specified in criterion 5)
3: MD/TD value fell within the range of 0.89 to 1.11 (except the ranges specified in criteria 4 and 5)
2: MD/TD value fell within the range of 0.85 to 1.15 (except the ranges specified in criteria 3 to 5)
1: MD/TD value fell within the range of less than 0.85 or more than 1.15

9) Transparency of Sheet-Shaped Molded Article

Using the sheet-shaped molded articles having a thickness of about 250 μm and obtained in Examples and Comparative Examples, haze values (%) were measured by a haze meter (NDH-1001DP, manufactured by Nippon Denshoku Industries Co., Ltd.) and used as a reference for transparency. Based on the haze values obtained, evaluation was made in accordance with the following criteria.

5: The haze value was less than 6%
4: The haze value was 6% or more and less than 10%
3: The haze value was 10% or more and less than 15%
2: The haze value was 15% or more and less than 20%
1: The haze value was 20% or more 10) Low Stickiness of Sheet-Shaped Molded Article The sheet-shaped molded articles having a thickness of about 250 μm and obtained in Examples and Comparative Examples were cut out into test pieces of 5 cm×8 cm and 4 cm×6 cm. The two test pieces obtained were laminated (upper surface: 5 cm×8 cm, lower surface: 4 cm×5 cm) and a load (size: 6 cm×10 cm×1 cm) of 500 g was placed on the upper surface. The test pieces were allowed to stand still for 60 seconds, and peeled at an angle of 180° by a tension tester (MINEBEA CO., LTD., Tg-5 kN) at a rate of 100 mm/minute. The tack strength (J) at this time was measured and used as a reference for low stickiness. Based on the tack strength obtained, evaluation was made in accordance with the following criteria.

5: Tack strength was less than 3 N
4: Tack strength was 3 N or more and less than 5 N
3: Tack strength was 5 N or more and less than 10 N
2: Tack strength was 10 N or more and less than 15 N
1: Tack strength was 15 N or more 11) Shock Resistance of Bag The sheet-shaped molded articles having a thickness of 200 μm and obtained in Examples and Comparative Examples were cut out into test pieces of 20 cm×13 cm. Two test pieces were laminated and three sides thereof were heat-sealed at 145° C. for two seconds to make a bag. In the bag, 500 ml of water was added, a remaining side was heat-sealed in the same condition as above to make a bag containing water. After the bag containing water was further allowed to stand still at a refrigerating room of 4° C. for 24 hours, 10 bags per Example were dropped from a level of 1.8 m. The ratio of broken bags was determined and used as a reference for shock resistance. From the broken bag ratio obtained, evaluation was made in accordance with the following criteria.

5: The ratio of non-broken bag was 100%
4: The ratio of non-broken bag was 80% or more and less than 100%
3: The ratio of non-broken bag was 60% or more and less than 80%
2: The ratio of non-broken bag was 40% or more and less than 60%
1: The ratio of non-broken bag was less than 40%

<Production Example of Hydrogenated Block Copolymer (a)>

(Preparation of Hydrogenation Catalyst)

A hydrogenation catalyst used in the hydrogenation reaction for a hydrogenated block copolymer (a) was prepared by the following method. In a reaction vessel replaced with nitrogen, dried and purified cyclohexane (1 L) was placed and bis(η5-cyclopentadienyl)titanium dichloride (100 mmol) was added. While sufficiently stirring the mixture, a n-hexane solution containing trimethylaluminum (200 mmol) was added to the mixture. The mixture was allowed to react at room temperature for about 3 days.

(Preparation of Hydrogenated Block Copolymers (a-1) to (a-48))

Batch polymerization was performed in a vessel type reactor equipped with a stirrer and a jacket and having an internal volume of 10 L. In the reactor, cyclohexane (1 L) was placed and a polymerization reaction was performed in the conditions shown in Table 1. In this manner, block copolymers (a-1) to (a-48) were obtained.

As monomers, styrene (concentration: 20% by mass) in a cyclohexane solution and butadiene (concentration of 20% by mass) in a cyclohexane solution were used.

To the resultant block copolymer, the hydrogenation catalyst as mentioned above was added so as to have a concentration (in terms of titanium) of 100 ppm per block copolymer (100 parts by mass). A hydrogenation reaction was performed at a hydrogen pressure of 0.7 MPa and a temperature of 70° C. Thereafter, methanol was added and then octadecyl-3-(3,5-di-t-butyl-4-hydroxyphenyl) propionate serving as a stabilizer was added in a ratio of 0.3 parts by mass based on the hydrogenated block copolymer.

The analysis results of the hydrogenated block copolymers (a-1) to (a-48) obtained are shown in Table 2. The hydrogenated block copolymers (a-28) to (a-30) and (a-46) to (a-48) each were obtained by blending polymer solutions obtained in different reactors in a predetermined ratio so as to contain the hydrogenated block copolymer represented by Formula (1) in a desired amount.

TABLE 1

| | | BuLi Parts by mass based on 100 parts by mass of all the monomers | TMEDA Number of moles based on BuLi | First step S Parts by mass | First step Temperature °C. | First step Input time Minutes | First step Reaction time Minutes | Second step B1 Parts by mass | Second step Temperature °C. | Second step Input time Minutes | Second step Reaction time Minutes |
|---|---|---|---|---|---|---|---|---|---|---|---|
| Example 1 | a-1 | 0.053 | 0.50 | 12 | 65 | 10 | 5 | 44 | 65 | 30 | 5 |
| Example 2 | a-2 | 0.060 | 0.50 | 18 | 65 | 14 | 5 | 41 | 65 | 28 | 5 |
| Example 3 | a-3 | 0.046 | 0.50 | 9 | 65 | 8 | 5 | 53 | 65 | 36 | 5 |
| Example 4 | a-4 | 0.053 | 0.50 | 12 | 65 | 10 | 5 | 10 | 65 | 7 | 5 |
| Example 5 | a-5 | 0.053 | 0.50 | 12 | 65 | 10 | 5 | 56 | 65 | 38 | 5 |
| Example 6 | a-6 | 0.053 | 0.15 | 12 | 65 | 10 | 5 | 44 | 65 | 30 | 5 |
| Example 7 | a-7 | 0.053 | 0.50 | 12 | 65 | 10 | 5 | 44 | 65 | 30 | 5 |
| Example 8 | a-8 | 0.053 | 0.50 | 12 | 65 | 10 | 5 | 44 | 65 | 30 | 5 |
| Example 9 | a-9 | 0.090 | 0.50 | 12 | 65 | 10 | 5 | 44 | 65 | 30 | 5 |
| Example 10 | a-10 | 0.090 | 0.50 | 12 | 65 | 10 | 5 | 44 | 65 | 30 | 5 |
| Example 11 | a-11 | 0.090 | 0.50 | 12 | 65 | 10 | 5 | 44 | 65 | 30 | 5 |
| Example 12 | a-12 | 0.090 | 0.50 | 12 | 65 | 10 | 5 | 44 | 65 | 30 | 5 |
| Example 13 | a-13 | 0.090 | 0.50 | 12 | 65 | 10 | 5 | 44 | 65 | 30 | 5 |
| Example 14 | a-14 | 0.090 | 0.50 | 12 | 65 | 10 | 5 | 44 | 65 | 30 | 5 |
| Example 15 | a-15 | 0.100 | 0.50 | 12 | 65 | 10 | 5 | 44 | 65 | 30 | 5 |
| Example 16 | a-16 | 0.128 | 0.50 | 12 | 65 | 10 | 5 | 44 | 65 | 30 | 5 |
| Example 17 | a-17 | 0.133 | 0.50 | 18 | 65 | 14 | 5 | 41 | 65 | 28 | 5 |
| Example 18 | a-18 | 0.071 | 0.50 | 8 | 65 | 8 | 5 | 46 | 65 | 32 | 5 |
| Example 19 | a-19 | 0.086 | 0.50 | 12 | 65 | 10 | 5 | 10 | 65 | 7 | 5 |
| Example 20 | a-20 | 0.086 | 0.50 | 12 | 65 | 10 | 5 | 10 | 65 | 7 | 5 |
| Example 21 | a-21 | 0.086 | 0.50 | 12 | 65 | 10 | 5 | 10 | 65 | 7 | 5 |
| Example 22 | a-22 | 0.097 | 0.50 | 12 | 65 | 10 | 5 | 56 | 65 | 38 | 5 |
| Example 23 | a-23 | 0.097 | 0.50 | 12 | 65 | 10 | 5 | 56 | 65 | 38 | 5 |
| Example 24 | a-24 | 0.097 | 0.50 | 12 | 65 | 10 | 5 | 56 | 65 | 38 | 5 |
| Example 25 | a-25 | 0.090 | 0.25 | 12 | 65 | 10 | 5 | 44 | 65 | 30 | 5 |
| Example 26 | a-26 | 0.090 | 0.50 | 12 | 65 | 10 | 5 | 44 | 65 | 30 | 5 |
| Example 27 | a-27 | 0.090 | 0.50 | 12 | 65 | 10 | 5 | 44 | 65 | 30 | 5 |
| Example 28 | a-28 A B | 0.053 0.213 | 0.50 0.50 | 12 12 | 65 65 | 10 10 | 5 5 | 44 44 | 65 65 | 30 30 | 5 5 |
| Example 29 | a-29 A B | 0.091 0.046 | 0.50 0.50 | 6 6 | 65 65 | 5 5 | 5 5 | 44 44 | 65 65 | 30 30 | 5 5 |
| Example 30 | a-30 A B | 0.091 0.046 | 0.50 0.50 | 6 6 | 65 65 | 10 5 | 5 5 | 44 41 | 65 65 | 30 28 | 5 5 |
| Comparative Example 1 | a-31 | 0.046 | 0.50 | 2 | 65 | 2 | 5 | 49 | 65 | 27 | 5 |
| Comparative Example 2 | a-32 | 0.060 | 0.50 | 24 | 65 | 20 | 5 | 38 | 65 | 15 | 5 |
| Comparative Example 3 | a-33 | 0.053 | 0.50 | 10 | 65 | 8 | 5 | 2 | 65 | 2 | 5 |
| Comparative Example 4 | a-34 | 0.053 | 0.50 | 12 | 65 | 10 | 5 | 65 | 65 | 44 | 5 |
| Comparative Example 5 | a-35 | 0.053 | 0.15 | 12 | 65 | 10 | 5 | 44 | 65 | 30 | 5 |
| Comparative Example 6 | a-36 | 0.053 | 0.50 | 12 | 65 | 10 | 5 | 44 | 65 | 30 | 5 |
| Comparative Example 7 | a-37 | 0.053 | 0.50 | 12 | 65 | 10 | 5 | 44 | 65 | 30 | 5 |
| Comparative Example 8 | a-38 | 0.071 | 0.50 | 2 | 65 | 2 | 5 | 49 | 65 | 27 | 5 |
| Comparative Example 9 | a-39 | 0.133 | 0.50 | 24 | 65 | 20 | 5 | 38 | 65 | 15 | 5 |
| Comparative Example 10 | a-40 | 0.086 | 0.50 | 10 | 65 | 8 | 5 | 2 | 65 | 2 | 5 |

TABLE 1-continued

| | | | | Fourth step | | | Fifth step | | | |
|---|---|---|---|---|---|---|---|---|---|---|
| | | S Parts by mass | Temperature °C | Input time Minutes | Reaction time Minutes | B3 Parts by mass | Temperature °C | Input time Minutes | Reaction time Minutes |
| Comparative Example 11 | a-41 | 0.097 | 65 | 10 | 5 | 65 | 44 | 5 |
| Comparative Example 12 | a-42 | 0.090 | 44 | 10 | 5 | 65 | 30 | 5 |
| Comparative Example 13 | a-43 | 0.090 | 44 | 10 | 5 | 65 | 30 | 5 |
| Comparative Example 14 | a-44 | 0.090 | 44 | 10 | 5 | 65 | 30 | 5 |
| Comparative Example 15 | a-45 | 0.090 | 44 | 10 | 5 | 65 | 30 | 5 |
| Comparative Example 16 | a-46 A | 0.053 | 44 | 10 | 5 | 65 | 30 | 5 |
| | B | 0.213 | 44 | 10 | 5 | 65 | 30 | 5 |
| Comparative Example 17 | a-47 | 0.091 | 44 | 10 | 5 | 65 | 30 | 5 |
| Comparative Example 18 | a-48 A | 0.046 | 44 | 5 | 5 | 65 | 30 | 5 |
| | B | 0.046 | 41 | 5 | 5 | 65 | 28 | 5 |

| | | Third step | | | | | | | Fourth step | | | Fifth step | | | |
|---|---|---|---|---|---|---|---|---|---|---|---|---|---|---|---|
| | | B2 Parts by mass | Temperature °C | TMEDA Number of moles based on BuLi | NaOAm Number of moles based on BuLi | Input time Minutes | Reaction time Minutes | S Parts by mass | Temperature °C | Input time Minutes | Reaction time Minutes | B3 Parts by mass | Temperature °C | Input time Minutes | Reaction time Minutes |
| Example 1 | a-1 | 44 | 60 | 0.80 | 0.05 | 30 | 5 | | | | | | | | |
| Example 2 | a-2 | 41 | 60 | 0.80 | 0.05 | 28 | 5 | | | | | | | | |
| Example 3 | a-3 | 38 | 60 | 0.80 | 0.05 | 36 | 5 | | | | | | | | |
| Example 4 | a-4 | 78 | 60 | 0.80 | 0.05 | 53 | 5 | | | | | | | | |
| Example 5 | a-5 | 32 | 60 | 0.80 | 0.05 | 22 | 5 | | | | | | | | |
| Example 6 | a-6 | 44 | 60 | 1.00 | 0.05 | 30 | 5 | | | | | | | | |
| Example 7 | a-7 | 44 | 60 | 0.40 | 0.05 | 30 | 5 | | | | | | | | |
| Example 8 | a-8 | 44 | 60 | 0.80 | 0.05 | 30 | 5 | | | | | | | | |
| Example 9 | a-9 | 44 | 60 | 0.80 | 0.05 | 30 | 5 | | | | | | | | |
| Example 10 | a-10 | 44 | 60 | 0.80 | 0.05 | 30 | 5 | | | | | | | | |
| Example 11 | a-11 | 44 | 60 | 0.80 | 0.05 | 30 | 5 | | | | | | | | |
| Example 12 | a-12 | 44 | 60 | 0.80 | 0.05 | 30 | 5 | | | | | | | | |
| Example 13 | a-13 | 44 | 60 | 0.80 | 0.05 | 30 | 5 | | | | | | | | |
| Example 14 | a-14 | 44 | 60 | 0.80 | 0.05 | 30 | 5 | | | | | | | | |
| Example 15 | a-15 | 44 | 60 | 0.80 | 0.05 | 30 | 5 | | | | | | | | |
| Example 16 | a-16 | 44 | 60 | 0.80 | 0.05 | 30 | 5 | | | | | | | | |
| Example 17 | a-17 | 41 | 60 | 0.80 | 0.05 | 28 | 5 | | | | | | | | |
| Example 18 | a-18 | 46 | 60 | 0.80 | 0.05 | 30 | 5 | | | | | | | | |
| Example 19 | a-19 | 78 | 60 | 0.80 | 0.05 | 53 | 5 | | | | | | | | |
| Example 20 | a-20 | 78 | 60 | 0.80 | 0.05 | 53 | 5 | | | | | | | | |
| Example 21 | a-21 | 78 | 60 | 0.80 | 0.05 | 53 | 5 | | | | | | | | |
| Example 22 | a-22 | 32 | 60 | 0.80 | 0.05 | 22 | 5 | | | | | | | | |
| Example 23 | a-23 | 32 | 60 | 0.80 | 0.05 | 22 | 5 | | | | | | | | |
| Example 24 | a-24 | 32 | 60 | 0.80 | 0.05 | 22 | 5 | | | | | | | | |
| Example 25 | a-25 | 44 | 60 | 0.90 | 0.05 | 30 | 5 | | | | | | | | |
| Example 26 | a-26 | 44 | 60 | 0.40 | 0.05 | 30 | 5 | | | | | | | | |
| Example 27 | a-27 | 44 | 60 | 0.80 | 0.05 | 30 | 5 | | | | | | | | |
| Example 28 | a-28 A | 44 | 60 | 0.80 | 0.05 | 30 | 5 | | | | | | | | |
| | B | 44 | 60 | 0.80 | 0.05 | 30 | 5 | | | | | | | | |

TABLE 1-continued

| | | | | | | | | | | | | | |
|---|---|---|---|---|---|---|---|---|---|---|---|---|---|
| Example 29 | a-29 | A | 44 | 60 | 0.80 | 0.05 | 30 | 5 | 6 | 65 | 5 | | |
| | | B | 44 | 60 | 0.80 | 0.05 | 30 | 5 | | | | | |
| Example 30 | a-30 | A | 44 | 60 | 0.80 | 0.05 | 30 | 5 | 6 | 65 | 5 | | |
| | | B | 41 | 60 | 0.80 | 0.05 | 28 | 5 | | | | 4 | 5 |
| Comparative Example 1 | a-31 | | 49 | 60 | 0.80 | 0.05 | 41 | 5 | | | | | |
| Comparative Example 2 | a-32 | | 38 | 60 | 0.80 | 0.05 | 25 | 5 | | | | | |
| Comparative Example 3 | a-33 | | 88 | 60 | 0.80 | 0.05 | 60 | 5 | | | | | |
| Comparative Example 4 | a-34 | | 23 | 60 | 0.80 | 0.05 | 16 | 5 | | | | | |
| Comparative Example 5 | a-35 | | 44 | 60 | 1.00 | 0.05 | 30 | 5 | | | | | |
| Comparative Example 6 | a-36 | | 44 | 60 | 0.30 | 0.05 | 30 | 5 | | | | | |
| Comparative Example 7 | a-37 | | 44 | 60 | 0.80 | 0.05 | 30 | 5 | | | | | |
| Comparative Example 8 | a-38 | | 49 | 60 | 0.80 | 0.05 | 41 | 5 | | | | | |
| Comparative Example 9 | a-39 | | 38 | 60 | 0.80 | 0.05 | 25 | 5 | | | | | |
| Comparative Example 10 | a-40 | | 88 | 60 | 0.80 | 0.05 | 60 | 5 | | | | | |
| Comparative Example 11 | a-41 | | 23 | 60 | 0.80 | 0.05 | 16 | 5 | | | | | |
| Comparative Example 12 | a-42 | | 44 | 60 | 1.00 | 0.05 | 30 | 5 | | | | | |
| Comparative Example 13 | a-43 | | 44 | 60 | 0.30 | 0.05 | 30 | 5 | | | | | |
| Comparative Example 14 | a-44 | | 44 | 60 | 0.80 | 0.05 | 30 | 5 | | | | | |
| Comparative Example 15 | a-45 | | 44 | 60 | 0.80 | 0.05 | 30 | 5 | | | | | |
| Comparative Example 16 | a-46 | A | 44 | 60 | 0.80 | 0.05 | 30 | 5 | | | | | |
| | | B | 44 | 60 | 0.80 | 0.05 | 30 | 5 | | | | | |
| Comparative Example 17 | a-47 | A | 44 | 60 | 0.80 | 0.05 | 30 | 5 | 6 | 65 | 5 | | |
| | | B | 44 | 60 | 0.80 | 0.05 | 30 | 5 | | | | | |
| Comparative Example 18 | a-48 | A | 44 | 60 | 0.80 | 0.05 | 30 | 5 | 6 | 65 | 5 | | |
| | | B | 41 | 60 | 0.80 | 0.05 | 28 | 5 | | | | 4 | 5 |

| | | Coupling agent | | | | | | Content of |
|---|---|---|---|---|---|---|---|---|
| | | Type | Number of moles based on BuLi | Coupling reaction temperature/time | Coupling rate % by mass | Hydrogenation rate Mol % | Special note | MFR g/10 minutes | Formula (1) % by mass |
| Example 1 | a-1 | Not added | — | — | — | 98 | — | 3.2 | 100 |
| Example 2 | a-2 | Not added | — | — | — | 98 | — | 2.9 | 100 |
| Example 3 | a-3 | Not added | — | — | — | 98 | — | 4.2 | 100 |
| Example 4 | a-4 | Not added | — | — | — | 98 | — | 5.5 | 100 |
| Example 5 | a-5 | Not added | — | — | — | 98 | — | 2.1 | 100 |
| Example 6 | a-6 | Not added | — | — | — | 98 | — | 1.7 | 100 |
| Example 7 | a-7 | Not added | — | — | — | 98 | — | 2.4 | 100 |
| Example 8 | a-8 | Not added | — | — | — | 75 | Hydrogenation was stopped in the middle | 19.4 | 100 |
| Example 9 | a-9 | Dimethoxydimethylsilane | 0.012 | 65° C./10 minutes | 6 | 98 | — | 10.5 | 94 |
| Example 10 | a-10 | Dimethoxydimethylsilane | 0.060 | 65° C./10 minutes | 12 | 98 | — | 9.3 | 88 |
| Example 11 | a-11 | Dimethoxydimethylsilane | 0.125 | 65° C./10 minutes | 25 | 98 | — | 8.1 | 75 |
| Example 12 | a-12 | Dimethoxydimethylsilane | 0.170 | 65° C./10 minutes | 34 | 98 | — | 7.0 | 66 |
| Example 13 | a-13 | Dimethoxydimethylsilane | 0.225 | 65° C./10 minutes | 45 | 98 | — | 5.9 | 55 |
| Example 14 | a-14 | Dimethoxydimethylsilane | 0.290 | 65° C./10 minutes | 58 | 98 | — | 4.2 | 42 |
| Example 15 | a-15 | Methyltrimethoxysilane | 0.116 | 65° C./10 minutes | 35 | 98 | — | 6.8 | 65 |
| Example 16 | a-16 | Tetramethoxysilane | 0.083 | 65° C./10 minutes | 33 | 98 | — | 6.5 | 67 |
| Example 17 | a-17 | Dimethoxydimethylsilane | 0.175 | 65° C./10 minutes | 35 | 95 | — | 6.6 | 65 |
| Example 18 | a-18 | Dimethoxydimethylsilane | 0.171 | 65° C./10 minutes | 34 | 97 | — | 6.0 | 66 |
| Example 19 | a-19 | Dimethoxydimethylsilane | 0.295 | 65° C./10 minutes | 59 | 99 | — | 3.5 | 41 |
| Example 20 | a-20 | Dimethoxydimethylsilane | 0.180 | 65° C./10 minutes | 36 | 99 | — | 6.6 | 64 |
| Example 21 | a-21 | Dimethoxydimethylsilane | 0.070 | 65° C./10 minutes | 14 | 99 | — | 9.3 | 86 |

TABLE 1-continued

| Example | ID | Silane | Amount | Conditions | Col A | Col B | Notes | Val 1 | Val 2 |
|---|---|---|---|---|---|---|---|---|---|
| Example 22 | a-22 | Dimethoxydimethylsilane | 0.280 | 65° C./10 minutes | 56 | 98 | — | 2.8 | 44 |
| Example 23 | a-23 | Dimethoxydimethylsilane | 0.165 | 65° C./10 minutes | 33 | 98 | — | 6.3 | 67 |
| Example 24 | a-24 | Dimethoxydimethylsilane | 0.065 | 65° C./10 minutes | 13 | 98 | — | 9.8 | 87 |
| Example 25 | a-25 | Dimethoxydimethylsilane | 0.170 | 65° C./10 minutes | 33 | 99 | — | 4.9 | 67 |
| Example 26 | a-26 | Dimethoxydimethylsilane | 0.174 | 65° C./10 minutes | 35 | 97 | — | 5.5 | 65 |
| Example 27 | a-27 | Dimethoxydimethylsilane | 0.165 | 65° C./10 minutes | 32 | 79 | Hydrogenation was stopped in the middle | 18.2 | 68 |
| Example 28 A | a-28 | Not added | — | — | — | 98 | A corresponds to Formula (1) | 5.2 | 68 |
| B | | Dimethoxydimethylsilane | 0.492 | 65° C./10 minutes | 98 | 99 | A and B in solutions were blended | | |
| Example 29 A | a-29 | Not added | — | — | — | 98 | A corresponds to Formula (1) | 5.6 | 66 |
| B | | Not added | — | — | — | 97 | A and B in solutions were blended | | |
| Example 30 A | a-30 | Not added | — | — | — | 98 | A corresponds to Formula (1) | 7.9 | 65 |
| B | | Not added | — | — | — | 96 | A and B in solutions were blended | | |
| Comparative Example 1 | a-31 | Not added | — | — | — | 96 | — | 15.6 | 100 |
| Comparative Example 2 | a-32 | Not added | — | — | — | 95 | — | 0.8 | 100 |
| Comparative Example 3 | a-33 | Not added | — | — | — | 98 | — | 8.1 | 100 |
| Comparative Example 4 | a-34 | Not added | — | — | — | 97 | — | 1.2 | 100 |
| Comparative Example 5 | a-35 | Not added | — | — | — | 99 | — | 0.7 | 100 |
| Comparative Example 6 | a-36 | Not added | — | — | — | 66 | — | 1.4 | 100 |
| Comparative Example 7 | a-37 | Not added | — | — | — | 96 | Hydrogenation was stopped in the middle | 27.6 | 100 |
| Comparative Example 8 | a-38 | Dimethoxydimethylsilane | 0.180 | 65° C./10 minutes | 36 | 96 | — | 19.3 | 64 |
| Comparative Example 9 | a-39 | Dimethoxydimethylsilane | 0.161 | 65° C./10 minutes | 32 | 95 | — | 1.5 | 68 |
| Comparative Example 10 | a-40 | Dimethoxydimethylsilane | 0.182 | 65° C./10 minutes | 36 | 98 | — | 8.1 | 64 |
| Comparative Example 11 | a-41 | Dimethoxydimethylsilane | 0.178 | 65° C./10 minutes | 35 | 97 | — | 4.7 | 65 |
| Comparative Example 12 | a-42 | Dimethoxydimethylsilane | 0.163 | 65° C./10 minutes | 32 | 99 | — | 1.2 | 68 |
| Comparative Example 13 | a-43 | Dimethoxydimethylsilane | 0.165 | 65° C./10 minutes | 33 | 66 | — | 3.5 | 67 |
| Comparative Example 14 | a-44 | Dimethoxydimethylsilane | 0.165 | 65° C./10 minutes | 33 | 67 | Hydrogenation was stopped in the middle | 26.1 | 67 |
| Comparative Example 15 | a-45 | Dimethoxydimethylsilane | 0.323 | 65° C./10 minutes | 64 | 98 | — | 3.2 | 36 |
| Comparative Example 16 A | a-46 | Not added | — | — | — | 99 | A corresponds to Formula (1) | 9.3 | 35 |
| B | | Dimethoxydimethylsilane | 0.49 | 65° C./10 minutes | 98 | 98 | A and B in solutions were blended | | |
| Comparative Example 17 | a-47 | Not added | — | — | — | 97 | — | 3.0 | 31 |
| Comparative Example 18 | a-48 | Not added | — | — | — | 98 | — | 4.8 | 33 |

TABLE 2

| | | | Formula (1) | | | | | | | |
|---|---|---|---|---|---|---|---|---|---|---|
| | | | Content (% by mass) | | | Amount of vinyl bond (mol %) | | Average amount of vinyl bond in B | Hydrogenation rate |
| | | Structure | S | B | B1 | B2 | B1 | B2 | | |
| Example 1 | a-1 | S-B1-B2 | 12 | 88 | 44 | 44 | 50 | 80 | 65 | 98 |
| Example 2 | a-2 | S-B1-B2 | 18 | 82 | 41 | 41 | 50 | 80 | 65 | 98 |
| Example 3 | a-3 | S-B1-B2 | 9 | 91 | 53 | 38 | 50 | 70 | 58 | 98 |
| Example 4 | a-4 | S-B1-B2 | 12 | 88 | 10 | 78 | 50 | 80 | 77 | 98 |
| Example 5 | a-5 | S-B1-B2 | 12 | 88 | 56 | 32 | 50 | 80 | 61 | 98 |
| Example 6 | a-6 | S-B1-B2 | 12 | 88 | 44 | 44 | 34 | 80 | 57 | 98 |
| Example 7 | a-7 | S-B1-B2 | 12 | 88 | 44 | 44 | 50 | 62 | 56 | 98 |
| Example 8 | a-8 | S-B1-B2 | 12 | 88 | 44 | 44 | 50 | 80 | 65 | 75 |
| Example 9 | a-9 | S-B1-B2 | 12 | 88 | 44 | 44 | 50 | 80 | 65 | 98 |
| Example 10 | a-10 | S-B1-B2 | 12 | 88 | 44 | 44 | 50 | 80 | 65 | 98 |
| Example 11 | a-11 | S-B1-B2 | 12 | 88 | 44 | 44 | 50 | 80 | 65 | 98 |
| Example 12 | a-12 | S-B1-B2 | 12 | 88 | 44 | 44 | 50 | 80 | 65 | 98 |
| Example 13 | a-13 | S-B1-B2 | 12 | 88 | 44 | 44 | 50 | 80 | 65 | 98 |
| Example 14 | a-14 | S-B1-B2 | 12 | 88 | 44 | 44 | 50 | 80 | 65 | 98 |
| Example 15 | a-15 | S-B1-B2 | 12 | 88 | 44 | 44 | 50 | 80 | 65 | 98 |
| Example 16 | a-16 | S-B1-B2 | 12 | 88 | 44 | 44 | 50 | 80 | 65 | 98 |
| Example 17 | a-17 | S-B1-B2 | 18 | 82 | 41 | 41 | 55 | 91 | 73 | 95 |
| Example 18 | a-18 | S-B1-B2 | 8 | 92 | 46 | 46 | 50 | 80 | 65 | 97 |
| Example 19 | a-19 | S-B1-B2 | 12 | 88 | 10 | 78 | 50 | 80 | 77 | 99 |
| Example 20 | a-20 | S-B1-B2 | 12 | 88 | 10 | 78 | 50 | 80 | 77 | 99 |
| Example 21 | a-21 | S-B1-B2 | 12 | 88 | 10 | 78 | 50 | 80 | 77 | 99 |
| Example 22 | a-22 | S-B1-B2 | 12 | 88 | 56 | 32 | 50 | 80 | 61 | 98 |
| Example 23 | a-23 | S-B1-B2 | 12 | 88 | 56 | 32 | 50 | 80 | 61 | 98 |
| Example 24 | a-24 | S-B1-B2 | 12 | 88 | 56 | 32 | 50 | 80 | 61 | 98 |
| Example 25 | a-25 | S-B1-B2 | 12 | 88 | 44 | 44 | 34 | 80 | 57 | 99 |
| Example 26 | a-26 | S-B1-B2 | 12 | 88 | 44 | 44 | 50 | 62 | 56 | 97 |
| Example 27 | a-27 | S-B1-B2 | 12 | 88 | 44 | 44 | 50 | 80 | 65 | 79 |
| Example 28 | a-28 | S-B1-B2 | 12 | 88 | 44 | 44 | 50 | 80 | 65 | 98 |
| Example 29 | a-29 | S-B1-B2 | 12 | 88 | 44 | 44 | 50 | 80 | 65 | 98 |
| Example 30 | a-30 | S-B1-B2 | 12 | 88 | 44 | 44 | 50 | 80 | 65 | 98 |
| Comparative Example 1 | a-31 | S-B1-B2 | 2 | 98 | 49 | 49 | 50 | 80 | 65 | 96 |
| Comparative Example 2 | a-32 | S-B1-B2 | 24 | 76 | 38 | 38 | 50 | 80 | 65 | 96 |
| Comparative Example 3 | a-33 | S-B1-B2 | 10 | 90 | 2 | 88 | 50 | 80 | 79 | 95 |
| Comparative Example 4 | a-34 | S-B1-B2 | 12 | 88 | 65 | 23 | 50 | 80 | 58 | 98 |
| Comparative Example 5 | a-35 | S-B1-B2 | 12 | 88 | 44 | 44 | 27 | 80 | 54 | 97 |
| Comparative Example 6 | a-36 | S-B1-B2 | 12 | 88 | 44 | 44 | 50 | 55 | 53 | 99 |
| Comparative Example 7 | a-37 | S-B1-B2 | 12 | 88 | 44 | 44 | 50 | 80 | 65 | 66 |
| Comparative Example 8 | a-38 | S-B1-B2 | 2 | 98 | 49 | 49 | 50 | 80 | 65 | 96 |
| Comparative Example 9 | a-39 | S-B1-B2 | 24 | 76 | 38 | 38 | 50 | 80 | 65 | 96 |
| Comparative Example 10 | a-40 | S-B1-B2 | 10 | 90 | 2 | 88 | 50 | 80 | 79 | 95 |
| Comparative Example 11 | a-41 | S-B1-B2 | 12 | 88 | 65 | 23 | 50 | 80 | 58 | 98 |
| Comparative Example 12 | a-42 | S-B1-B2 | 12 | 88 | 44 | 44 | 27 | 80 | 54 | 97 |
| Comparative Example 13 | a-43 | S-B1-B2 | 12 | 88 | 44 | 44 | 50 | 55 | 53 | 99 |
| Comparative Example 14 | a-44 | S-B1-B2 | 12 | 88 | 44 | 44 | 50 | 80 | 65 | 66 |
| Comparative Example 15 | a-45 | S-B1-B2 | 12 | 88 | 44 | 44 | 50 | 80 | 65 | 98 |
| Comparative Example 16 | a-46 | S-B1-B2 | 12 | 88 | 44 | 44 | 50 | 80 | 65 | 98 |
| Comparative Example 17 | a-47 | S-B1-B2 | 12 | 88 | 44 | 44 | 50 | 80 | 65 | 98 |
| Comparative Example 18 | a-48 | S-B1-B2 | 12 | 88 | 44 | 44 | 50 | 80 | 65 | 98 |

| | | | Formula (2), Formula (3), Formula (4) | | | | | | | | | | | |
|---|---|---|---|---|---|---|---|---|---|---|---|---|---|---|
| | | | Content (% by mass) | | Structural composition (% by mass) | | | Amount of vinyl bond (mol %) | | | Hydrogenation rate | | Content of Formula (1) (% by mass) |
| | | Structure | S | B | S | B1 | B2 | S | B3 | B1 | B2 | B3 | n | |
| Example 1 | a-1 | | | | | | | — | | | | | | 100 |
| Example 2 | a-2 | | | | | | | — | | | | | | 100 |
| Example 3 | a-3 | | | | | | | — | | | | | | 100 |
| Example 4 | a-4 | | | | | | | — | | | | | | 100 |
| Example 5 | a-5 | | | | | | | — | | | | | | 100 |
| Example 6 | a-6 | | | | | | | — | | | | | | 100 |
| Example 7 | a-7 | | | | | | | — | | | | | | 100 |
| Example 8 | a-8 | | | | | | | — | | | | | | 100 |
| Example 9 | a-9 | (S-B1-B2)n | 12 | 88 | — | 44 | 44 | — | — | 50 | 80 | — | 98 | 2 | 94 |
| Example 10 | a-10 | (S-B1-B2)n | 12 | 88 | — | 44 | 44 | — | — | 50 | 80 | — | 98 | 2 | 88 |
| Example 11 | a-11 | (S-B1-B2)n | 12 | 88 | — | 44 | 44 | — | — | 50 | 80 | — | 98 | 2 | 75 |
| Example 12 | a-12 | (S-B1-B2)n | 12 | 88 | — | 44 | 44 | — | — | 50 | 80 | — | 98 | 2 | 66 |
| Example 13 | a-13 | (S-B1-B2)n | 12 | 88 | — | 44 | 44 | — | — | 50 | 80 | — | 98 | 2 | 55 |
| Example 14 | a-14 | (S-B1-B2)n | 12 | 88 | — | 44 | 44 | — | — | 50 | 80 | — | 98 | 2 | 42 |
| Example 15 | a-15 | (S-B1-B2)n | 12 | 88 | — | 44 | 44 | — | — | 50 | 80 | — | 98 | 3 | 65 |

TABLE 2-continued

| | | | | | | | | | | | | | | | |
|---|---|---|---|---|---|---|---|---|---|---|---|---|---|---|---|
| Example 16 | a-16 | (S-B1-B2)n | 12 | 88 | — | 44 | 44 | — | — | 50 | 80 | — | 98 | 4 | 67 |
| Example 17 | a-17 | (S-B1-B2)n | 18 | 82 | — | 44 | 44 | — | — | 55 | 91 | — | 95 | 2 | 65 |
| Example 18 | a-18 | (S-B1-B2)n | 8 | 92 | — | 46 | 46 | — | — | 50 | 80 | — | 97 | 2 | 66 |
| Example 19 | a-19 | (S-B1-B2)n | 12 | 88 | — | 10 | 78 | — | — | 50 | 80 | — | 99 | 2 | 41 |
| Example 20 | a-20 | (S-B1-B2)n | 12 | 88 | — | 10 | 78 | — | — | 50 | 80 | — | 99 | 2 | 64 |
| Example 21 | a-21 | (S-B1-B2)n | 12 | 88 | — | 10 | 78 | — | — | 50 | 80 | — | 99 | 2 | 86 |
| Example 22 | a-22 | (S-B1-B2)n | 12 | 88 | — | 56 | 32 | — | — | 50 | 80 | — | 98 | 2 | 44 |
| Example 23 | a-23 | (S-B1-B2)n | 12 | 88 | — | 56 | 32 | — | — | 50 | 80 | — | 98 | 2 | 67 |
| Example 24 | a-24 | (S-B1-B2)n | 12 | 88 | — | 56 | 32 | — | — | 50 | 80 | — | 98 | 2 | 87 |
| Example 25 | a-25 | (S-B1-B2)n | 12 | 88 | — | 44 | 44 | — | — | 34 | 80 | — | 99 | 2 | 67 |
| Example 26 | a-26 | (S-B1-B2)n | 12 | 88 | — | 44 | 44 | — | — | 50 | 62 | — | 97 | 2 | 65 |
| Example 27 | a-27 | (S-B1-B2)n | 12 | 88 | — | 44 | 44 | — | — | 50 | 80 | — | 79 | 2 | 68 |
| Example 28 | a-28 | (S-B1-B2)n | 12 | 88 | — | 44 | 44 | — | — | 55 | 91 | — | 95 | 2 | 68 |
| Example 29 | a-29 | S-B1-B2-S | 12 | 88 | 6 | 44 | 44 | 6 | — | 50 | 80 | — | 98 | — | 66 |
| Example 30 | a-30 | S-B1-B2-S-B3 | 12 | 88 | 6 | 41 | 41 | 6 | 6 | 50 | 80 | 80 | 98 | — | 65 |
| Comparative Example 1 | a-31 | | | | | | | | | — | | | | | 100 |
| Comparative Example 2 | a-32 | | | | | | | | | — | | | | | 100 |
| Comparative Example 3 | a-33 | | | | | | | | | — | | | | | 100 |
| Comparative Example 4 | a-34 | | | | | | | | | — | | | | | 100 |
| Comparative Example 5 | a-35 | | | | | | | | | — | | | | | 100 |
| Comparative Example 6 | a-36 | | | | | | | | | — | | | | | 100 |
| Comparative Example 7 | a-37 | | | | | | | | | — | | | | | 100 |
| Comparative Example 8 | a-38 | (S-B1-B2)n | 2 | 98 | — | 49 | 49 | — | — | 50 | 80 | — | 96 | 2 | 64 |
| Comparative Example 9 | a-39 | (S-B1-B2)n | 24 | 76 | — | 38 | 38 | — | — | 50 | 80 | — | 96 | 2 | 68 |
| Comparative Example 10 | a-40 | (S-B1-B2)n | 10 | 90 | — | 2 | 88 | — | — | 50 | 80 | — | 95 | 2 | 64 |
| Comparative Example 11 | a-41 | (S-B1-B2)n | 12 | 88 | — | 65 | 23 | — | — | 50 | 80 | — | 98 | 2 | 65 |
| Comparative Example 12 | a-42 | (S-B1-B2)n | 12 | 88 | — | 44 | 44 | — | — | 27 | 80 | — | 97 | 2 | 68 |
| Comparative Example 13 | a-43 | (S-B1-B2)n | 12 | 88 | — | 44 | 44 | — | — | 50 | 55 | — | 99 | 2 | 67 |
| Comparative Example 14 | a-44 | (S-B1-B2)n | 12 | 88 | — | 44 | 44 | — | — | 50 | 80 | — | 66 | 2 | 67 |
| Comparative Example 15 | a-45 | (S-B1-B2)n | 12 | 88 | — | 44 | 44 | — | — | 50 | 80 | — | 98 | 2 | 36 |
| Comparative Example 16 | a-46 | (S-B1-B2)n | 12 | 88 | — | 44 | 44 | — | — | 50 | 80 | — | 96 | 2 | 35 |
| Comparative Example 17 | a-47 | S-B1-B2-S | 12 | 88 | 6 | 44 | 44 | 6 | — | 50 | 80 | — | 98 | — | 31 |
| Comparative Example 18 | a-48 | S-B1-B2-S-B3 | 12 | 88 | 6 | 41 | 41 | 6 | 6 | 50 | 80 | 80 | 99 | — | 33 |

<Polypropylene-Based Resin>

Polypropylene-based resins used in Examples and Comparative Examples were as follows.

PP (1): a propylene-ethylene random copolymer ["PC630A" (trade name), manufactured by SunAllomer Ltd., MFR=6.8/10 minutes]

PP (2): a propylene-ethylene random copolymer ["PM931M" (trade name), manufactured by SunAllomer Ltd., MFR=25.1/10 minutes]

PP (3): a propylene homo-copolymer ["PL500A" (trade name), manufactured by SunAllomer Ltd., MFR=3.0/10 minutes]

Examples 31 to 64, Comparative Examples 19 to 38

Each of the hydrogenated block copolymers of Examples 1 to 30 and Comparative Examples 1 to 18 and a polypropylene-based resin were dry blended in accordance with the blend ratio shown in Table 3 and melt-kneaded by a twin screw extruder (L/D=42, 30 mmϕ) at 200° C., 350 rpm, in an extrusion amount of 5 Kg/h to obtain pellets of a polypropylene-based resin composition (diameter 3 mm, length 3 mm). These pellets were subjected to extrusion-molding by a single screw extruder (40 mmϕ) using a T die at 200 to 230° C., (extrusion amount: 5 Kg/h, T die slit thickness: 0.5 mm, T die slit width: 400 mm, roller surface temperature: 35° C.). In this manner, sheet-shaped molded articles having a thickness of 250 μm were individually formed. The thickness of the sheet-shaped molded articles were controlled by changing the screw rotation speed and take-up speed. The measurement results of the physical properties of sheet-shaped molded articles are shown in Table 3.

TABLE 3

| | | Example | | | | | | | | | | | | | | | |
|---|---|---|---|---|---|---|---|---|---|---|---|---|---|---|---|---|---|
| | | 31 | 32 | 33 | 34 | 35 | 36 | 37 | 38 | 39 | 40 | 41 | 42 | 43 | 44 | 45 | 46 | 47 |
| PP (1) r-PP | | 70 | 70 | 70 | 70 | 70 | 70 | 70 | 70 | 70 | 70 | 70 | 70 | 70 | 70 | 70 | 70 | 70 |
| PP (2) high flow-r-pp (added) | | | | | | | | | | | | | | | | | | |
| PP (3) h-PP | | | | | | | | | | | | | | | | | | |
| Hydrogenated block copolymer | a-1 | 30 | | | | | | | | | | | | | | | | |
| | a-2 | | 30 | | | | | | | | | | | | | | | |
| | a-3 | | | 30 | | | | | | | | | | | | | | |
| | a-4 | | | | 30 | | | | | | | | | | | | | |
| | a-5 | | | | | 30 | | | | | | | | | | | | |
| | a-6 | | | | | | 30 | | | | | | | | | | | |
| | a-7 | | | | | | | 30 | | | | | | | | | | |
| | a-8 | | | | | | | | 30 | | | | | | | | | |
| | a-9 | | | | | | | | | 30 | | | | | | | | |
| | a-10 | | | | | | | | | | 30 | | | | | | | |
| | a-11 | | | | | | | | | | | 30 | | | | | | |
| | a-12 | | | | | | | | | | | | 30 | | | | | |

TABLE 3-continued

|  |  |  | 31 | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|---|---|---|
|  |  | a-13 |  |  |  |  |  |  |  |  |  |  |  | 30 |  |  |  |  |  |
|  |  | a-14 |  |  |  |  |  |  |  |  |  |  |  |  | 30 |  |  |  |  |
|  |  | a-15 |  |  |  |  |  |  |  |  |  |  |  |  |  | 30 |  |  |  |
|  |  | a-16 |  |  |  |  |  |  |  |  |  |  |  |  |  |  | 30 |  |  |
|  |  | a-17 |  |  |  |  |  |  |  |  |  |  |  |  |  |  |  |  | 30 |
|  |  | a-18 |  |  |  |  |  |  |  |  |  |  |  |  |  |  |  |  |  |
|  |  | a-19 |  |  |  |  |  |  |  |  |  |  |  |  |  |  |  |  |  |
|  |  | a-20 |  |  |  |  |  |  |  |  |  |  |  |  |  |  |  |  |  |
|  |  | a-21 |  |  |  |  |  |  |  |  |  |  |  |  |  |  |  |  |  |
|  |  | a-22 |  |  |  |  |  |  |  |  |  |  |  |  |  |  |  |  |  |
|  |  | a-23 |  |  |  |  |  |  |  |  |  |  |  |  |  |  |  |  |  |
|  |  | a-24 |  |  |  |  |  |  |  |  |  |  |  |  |  |  |  |  |  |
|  |  | a-25 |  |  |  |  |  |  |  |  |  |  |  |  |  |  |  |  |  |
|  |  | a-26 |  |  |  |  |  |  |  |  |  |  |  |  |  |  |  |  |  |
|  |  | a-27 |  |  |  |  |  |  |  |  |  |  |  |  |  |  |  |  |  |
|  |  | a-28 |  |  |  |  |  |  |  |  |  |  |  |  |  |  |  |  |  |
|  |  | a-29 |  |  |  |  |  |  |  |  |  |  |  |  |  |  |  |  |  |
|  |  | a-30 |  |  |  |  |  |  |  |  |  |  |  |  |  |  |  |  |  |
|  |  | a-31 |  |  |  |  |  |  |  |  |  |  |  |  |  |  |  |  |  |
|  |  | a-32 |  |  |  |  |  |  |  |  |  |  |  |  |  |  |  |  |  |
|  |  | a-33 |  |  |  |  |  |  |  |  |  |  |  |  |  |  |  |  |  |
|  |  | a-34 |  |  |  |  |  |  |  |  |  |  |  |  |  |  |  |  |  |
|  |  | a-35 |  |  |  |  |  |  |  |  |  |  |  |  |  |  |  |  |  |
|  |  | a-36 |  |  |  |  |  |  |  |  |  |  |  |  |  |  |  |  |  |
|  |  | a-37 |  |  |  |  |  |  |  |  |  |  |  |  |  |  |  |  |  |
|  |  | a-38 |  |  |  |  |  |  |  |  |  |  |  |  |  |  |  |  |  |
|  |  | a-39 |  |  |  |  |  |  |  |  |  |  |  |  |  |  |  |  |  |
|  |  | a-40 |  |  |  |  |  |  |  |  |  |  |  |  |  |  |  |  |  |
|  |  | a-41 |  |  |  |  |  |  |  |  |  |  |  |  |  |  |  |  |  |
|  |  | a-42 |  |  |  |  |  |  |  |  |  |  |  |  |  |  |  |  |  |
|  |  | a-43 |  |  |  |  |  |  |  |  |  |  |  |  |  |  |  |  |  |
|  |  | a-44 |  |  |  |  |  |  |  |  |  |  |  |  |  |  |  |  |  |
|  |  | a-45 |  |  |  |  |  |  |  |  |  |  |  |  |  |  |  |  |  |
|  |  | a-46 |  |  |  |  |  |  |  |  |  |  |  |  |  |  |  |  |  |
|  |  | a-47 |  |  |  |  |  |  |  |  |  |  |  |  |  |  |  |  |  |
|  |  | a-48 |  |  |  |  |  |  |  |  |  |  |  |  |  |  |  |  |  |
| Performance evaluation | Sheet-shaped molded article | Heat sealability | 5 | 5 | 5 | 5 | 4 | 4 | 5 | 5 | 5 | 5 | 5 | 5 | 5 | 4 | 3 | 3 | 5 |
|  |  | Flexibility | 5 | 3 | 5 | 5 | 4 | 4 | 4 | 4 | 5 | 5 | 5 | 5 | 5 | 4 | 3 | 3 | 2 |
|  |  | Anisotropy | 5 | 3 | 5 | 5 | 4 | 4 | 4 | 4 | 5 | 5 | 5 | 5 | 5 | 4 | 3 | 3 | 2 |
|  |  | Transparency | 5 | 3 | 5 | 5 | 4 | 4 | 4 | 4 | 5 | 5 | 5 | 5 | 5 | 4 | 3 | 3 | 2 |
|  |  | Low stickiness | 2 | 3 | 2 | 2 | 3 | 3 | 3 | 2 | 3 | 3 | 4 | 5 | 5 | 5 | 5 | 5 | 5 |
|  | Bag | Shock resistance | 5 | 5 | 5 | 2 | 5 | 3 | 3 | 5 | 5 | 5 | 5 | 5 | 5 | 5 | 5 | 5 | 5 |
|  |  | Total score | 27 | 22 | 27 | 24 | 24 | 22 | 23 | 24 | 28 | 28 | 29 | 30 | 30 | 26 | 22 | 22 | 21 |

|  |  |  | Example |  |  |  |  |  |  |  |  |  |  |  |  |  |  |  |  |
|---|---|---|---|---|---|---|---|---|---|---|---|---|---|---|---|---|---|---|---|
|  |  |  | 48 | 49 | 50 | 51 | 52 | 53 | 54 | 55 | 56 | 57 | 58 | 59 | 60 | 61 | 62 | 63 | 64 |
| PP (1) r-PP |  |  | 70 | 70 | 70 | 70 | 70 | 70 | 70 | 70 | 70 | 70 | 70 | 70 | 70 |  |  | 25 | 85 |
| PP (2) high flow-r-pp (added) |  |  |  |  |  |  |  |  |  |  |  |  |  |  |  | 70 |  |  |  |
| PP (3) h-PP |  |  |  |  |  |  |  |  |  |  |  |  |  |  |  |  | 60 |  |  |
| Hydrogenated block copolymer | a-1 |  |  |  |  |  |  |  |  |  |  |  |  |  |  | 30 | 40 | 75 | 15 |
|  | a-2 |  |  |  |  |  |  |  |  |  |  |  |  |  |  |  |  |  |  |
|  | a-3 |  |  |  |  |  |  |  |  |  |  |  |  |  |  |  |  |  |  |
|  | a-4 |  |  |  |  |  |  |  |  |  |  |  |  |  |  |  |  |  |  |
|  | a-5 |  |  |  |  |  |  |  |  |  |  |  |  |  |  |  |  |  |  |
|  | a-6 |  |  |  |  |  |  |  |  |  |  |  |  |  |  |  |  |  |  |
|  | a-7 |  |  |  |  |  |  |  |  |  |  |  |  |  |  |  |  |  |  |
|  | a-8 |  |  |  |  |  |  |  |  |  |  |  |  |  |  |  |  |  |  |
|  | a-9 |  |  |  |  |  |  |  |  |  |  |  |  |  |  |  |  |  |  |
|  | a-10 |  |  |  |  |  |  |  |  |  |  |  |  |  |  |  |  |  |  |
|  | a-11 |  |  |  |  |  |  |  |  |  |  |  |  |  |  |  |  |  |  |
|  | a-12 |  |  |  |  |  |  |  |  |  |  |  |  |  |  |  |  |  |  |
|  | a-13 |  |  |  |  |  |  |  |  |  |  |  |  |  |  |  |  |  |  |
|  | a-14 |  |  |  |  |  |  |  |  |  |  |  |  |  |  |  |  |  |  |
|  | a-15 |  |  |  |  |  |  |  |  |  |  |  |  |  |  |  |  |  |  |
|  | a-16 |  |  |  |  |  |  |  |  |  |  |  |  |  |  |  |  |  |  |
|  | a-17 |  |  |  |  |  |  |  |  |  |  |  |  |  |  |  |  |  |  |
|  | a-18 |  | 30 |  |  |  |  |  |  |  |  |  |  |  |  |  |  |  |  |
|  | a-19 |  |  | 30 |  |  |  |  |  |  |  |  |  |  |  |  |  |  |  |
|  | a-20 |  |  |  | 30 |  |  |  |  |  |  |  |  |  |  |  |  |  |  |
|  | a-21 |  |  |  |  | 30 |  |  |  |  |  |  |  |  |  |  |  |  |  |
|  | a-22 |  |  |  |  |  | 30 |  |  |  |  |  |  |  |  |  |  |  |  |
|  | a-23 |  |  |  |  |  |  | 30 |  |  |  |  |  |  |  |  |  |  |  |
|  | a-24 |  |  |  |  |  |  |  | 30 |  |  |  |  |  |  |  |  |  |  |
|  | a-25 |  |  |  |  |  |  |  |  | 30 |  |  |  |  |  |  |  |  |  |
|  | a-26 |  |  |  |  |  |  |  |  |  | 30 |  |  |  |  |  |  |  |  |
|  | a-27 |  |  |  |  |  |  |  |  |  |  | 30 |  |  |  |  |  |  |  |
|  | a-28 |  |  |  |  |  |  |  |  |  |  |  | 30 |  |  |  |  |  |  |

TABLE 3-continued

| | | | | | | | | | | | | | | | | | | |
|---|---|---|---|---|---|---|---|---|---|---|---|---|---|---|---|---|---|---|
| | a-29 | | | | | | | | | | | | | 30 | | | | |
| | a-30 | | | | | | | | | | | | 30 | | | | | |
| | a-31 | | | | | | | | | | | | | | | | | |
| | a-32 | | | | | | | | | | | | | | | | | |
| | a-33 | | | | | | | | | | | | | | | | | |
| | a-34 | | | | | | | | | | | | | | | | | |
| | a-35 | | | | | | | | | | | | | | | | | |
| | a-36 | | | | | | | | | | | | | | | | | |
| | a-37 | | | | | | | | | | | | | | | | | |
| | a-38 | | | | | | | | | | | | | | | | | |
| | a-39 | | | | | | | | | | | | | | | | | |
| | a-40 | | | | | | | | | | | | | | | | | |
| | a-41 | | | | | | | | | | | | | | | | | |
| | a-42 | | | | | | | | | | | | | | | | | |
| | a-43 | | | | | | | | | | | | | | | | | |
| | a-44 | | | | | | | | | | | | | | | | | |
| | a-45 | | | | | | | | | | | | | | | | | |
| | a-46 | | | | | | | | | | | | | | | | | |
| | a-47 | | | | | | | | | | | | | | | | | |
| | a-48 | | | | | | | | | | | | | | | | | |
| Performance evaluation | Sheet-shaped molded article | Heat sealability | 5 | 5 | 5 | 5 | 3 | 4 | 4 | 3 | 4 | 5 | 5 | 5 | 5 | 5 | 2 | 5 | 3 |
| | | Flexibility | 5 | 4 | 4 | 5 | 3 | 4 | 5 | 3 | 3 | 4 | 5 | 5 | 5 | 4 | 3 | 5 | 2 |
| | | Anisotropy | 5 | 4 | 4 | 5 | 3 | 4 | 5 | 3 | 3 | 4 | 5 | 5 | 5 | 4 | 3 | 5 | 3 |
| | | Transparency | 5 | 4 | 4 | 5 | 3 | 4 | 5 | 3 | 3 | 4 | 5 | 5 | 5 | 4 | 3 | 5 | 2 |
| | | Low stickiness | 2 | 4 | 3 | 2 | 5 | 4 | 5 | 5 | 5 | 3 | 5 | 5 | 4 | 4 | 5 | 2 | 5 |
| | Bag | Shock resistance | 5 | 3 | 3 | 3 | 5 | 5 | 5 | 3 | 5 | 5 | 5 | 5 | 5 | 5 | 5 | 3 | 5 |
| | | Total score | 27 | 24 | 23 | 25 | 22 | 25 | 27 | 20 | 23 | 25 | 30 | 30 | 29 | 26 | 21 | 25 | 20 |

| | | Comparative Example | | | | | | | | | | | | | | | | | | | |
|---|---|---|---|---|---|---|---|---|---|---|---|---|---|---|---|---|---|---|---|---|
| | | 19 | 20 | 21 | 22 | 23 | 24 | 25 | 26 | 27 | 28 | 29 | 30 | 31 | 32 | 33 | 34 | 35 | 36 | 37 | 38 |
| PP (1) r-PP | | 70 | 70 | 70 | 70 | 5 | 95 | 70 | 5 | 95 | 70 | 5 | 95 | 70 | 5 | 95 | 70 | 5 | 95 | 5 | 95 |
| PP (2) high flow-r-pp (added) | | | | | | | | | | | | | | | | | | | | | |
| PP (3) h-PP | | | | | | | | | | | | | | | | | | | | | |
| Hydrogenated block copolymer | a-1 | | | | | | | | | | | | | | | | | | | 95 | 5 |
| | a-2 | | | | | | | | | | | | | | | | | | | | |
| | a-3 | | | | | | | | | | | | | | | | | | | | |
| | a-4 | | | | | | | | | | | | | | | | | | | | |
| | a-5 | | | | | | | | | | | | | | | | | | | | |
| | a-6 | | | | | | | | | | | | | | | | | | | | |
| | a-7 | | | | | | | | | | | | | | | | | | | | |
| | a-8 | | | | | | | | | | | | | | | | | | | | |
| | a-9 | | | | | | | | | | | | | | | | | | | | |
| | a-10 | | | | | | | | | | | | | | | | | | | | |
| | a-11 | | | | | | | | | | | | | | | | | | | | |
| | a-12 | | | | | | | | | | | | | | | | | | | | |
| | a-13 | | | | | | | | | | | | | | | | | | | | |
| | a-14 | | | | | | | | | | | | | | | | | | | | |
| | a-15 | | | | | | | | | | | | | | | | | | | | |
| | a-16 | | | | | | | | | | | | | | | | | | | | |
| | a-17 | | | | | | | | | | | | | | | | | | | | |
| | a-18 | | | | | | | | | | | | | | | | | | | | |
| | a-19 | | | | | | | | | | | | | | | | | | | | |
| | a-20 | | | | | | | | | | | | | | | | | | | | |
| | a-21 | | | | | | | | | | | | | | | | | | | | |
| | a-22 | | | | | | | | | | | | | | | | | | | | |
| | a-23 | | | | | | | | | | | | | | | | | | | | |
| | a-24 | | | | | | | | | | | | | | | | | | | | |
| | a-25 | | | | | | | | | | | | | | | | | | | | |
| | a-26 | | | | | | | | | | | | | | | | | | | | |
| | a-27 | | | | | | | | | | | | | | | | | | | | |
| | a-28 | | | | | | | | | | | | | | | | | | | | |
| | a-29 | | | | | | | | | | | | | | | | | | | | |
| | a-30 | | | | | | | | | | | | | | | | | | | | |
| | a-31 | | 30 | | | | | | | | | | | | | | | | | | |
| | a-32 | | | 30 | | | | | | | | | | | | | | | | | |
| | a-33 | | | | 30 | | | | | | | | | | | | | | | | |
| | a-34 | | | | | 30 | | | | | | | | | | | | | | | |
| | a-35 | | | | | | 30 | | | | | | | | | | | | | | |
| | a-36 | | | | | | | 30 | | | | | | | | | | | | | |
| | a-37 | | | | | | | | 30 | | | | | | | | | | | | |
| | a-38 | | | | | | | | | 30 | | | | | | | | | | | |
| | a-39 | | | | | | | | | | 30 | | | | | | | | | | |
| | a-40 | | | | | | | | | | | 30 | | | | | | | | | |
| | a-41 | | | | | | | | | | | | 30 | | | | | | | | |
| | a-42 | | | | | | | | | | | | | 30 | | | | | | | |
| | a-43 | | | | | | | | | | | | | | 30 | | | | | | |
| | a-44 | | | | | | | | | | | | | | | 30 | | | | | |

TABLE 3-continued

|  |  |  | | | | | | | | | | | | | | | | | | |
|---|---|---|---|---|---|---|---|---|---|---|---|---|---|---|---|---|---|---|---|---|
|  |  | a-45 | | | | | | | | | | | | | | | 30 | | | |
|  |  | a-46 | | | | | | | | | | | | | | | | 30 | | |
|  |  | a-47 | | | | | | | | | | | | | | | | | 30 | |
|  |  | a-48 | | | | | | | | | | | | | | | | | | 30 |
| Performance evaluation | Sheet-shaped molded article | Heat sealability | 5 | 3 | 5 | 4 | 3 | 2 | 5 | 5 | 1 | 5 | 2 | 1 | 1 | 5 | 2 | 2 | 2 | 2 | 5 | 1 |
|  |  | Flexibility | 5 | 1 | 5 | 1 | 2 | 2 | 3 | 5 | 1 | 5 | 1 | 1 | 1 | 2 | 2 | 2 | 2 | 2 | 5 | 1 |
|  |  | Anisotropy | 5 | 1 | 5 | 1 | 2 | 2 | 3 | 5 | 1 | 5 | 1 | 1 | 1 | 2 | 2 | 2 | 2 | 2 | 5 | 1 |
|  |  | Transparency | 5 | 1 | 5 | 1 | 2 | 2 | 3 | 5 | 1 | 5 | 1 | 1 | 1 | 2 | 2 | 2 | 2 | 2 | 5 | 1 |
|  |  | Low stickiness | 1 | 2 | 1 | 2 | 1 | 5 | 1 | 1 | 5 | 1 | 5 | 5 | 5 | 1 | 5 | 5 | 5 | 4 | 1 | 5 |
|  | Bag | Shock resistance | 4 | 5 | 1 | 5 | 1 | 5 | 5 | 4 | 5 | 1 | 5 | 3 | 5 | 5 | 5 | 5 | 5 | 5 | 2 | 3 |
|  |  | Total score | 25 | 13 | 22 | 14 | 11 | 18 | 20 | 25 | 14 | 22 | 15 | 12 | 14 | 17 | 18 | 18 | 18 | 17 | 23 | 12 |

The present application was filed based on Japanese Patent Application No. 2015-165172 filed Aug. 24, 2015, the content of which is incorporated herein by reference.

INDUSTRIAL APPLICABILITY

The molded article of the present embodiment is excellent in balance among heat sealability, flexibility, low anisotropy, transparency, low stickiness and shock resistance and can be applied to any use without limitation. Of them, in the food packaging field, garment packaging field and medical field (e.g., infusion bags and infusion tubes), the molded article can be suitably used.

The invention claimed is:

1. A hydrogenated block copolymer comprising: a polymer block (S) comprising an aromatic vinyl compound unit as a main constituent; and a polymer block (B) comprising a conjugated diene compound unit as a main constituent, in a molecule, wherein
a content of the polymer block (S) is 5 to 20% by mass and a content of the polymer block (B) is 80 to 95% by mass, in the hydrogenated block copolymer,
the polymer block (B) comprises a polymer block (B1) and a polymer block (B2); an amount of a vinyl bond of the polymer block (B1) before hydrogenation is 30 to 60 mol % and an amount of a vinyl bond of the polymer block (B2) before hydrogenation is more than 60 to 100 mol %,
a content of the polymer block (B1) is 5 to 60% by mass and a content of the polymer block (B2) is 30 to 85% by mass, in the hydrogenated block copolymer,
a content of a structure represented by following Formula (1) in the hydrogenated block copolymer is 40 to 100% by mass:

(S-B)            Formula (1)

wherein, S represents the polymer block (S) and B represents the polymer block (B), and
a hydrogenation rate of the hydrogenated block copolymer is 70 mol % or more, and
wherein the structure represented by Formula (1) has the polymer block (S), the polymer block (B1) and the polymer block (B2) in this order.

2. The hydrogenated block copolymer according to claim 1, wherein
a content of the structure represented by Formula (1) is 40 to 90% by mass, and
the hydrogenated block copolymer further comprises any one of structures represented by following formulae (2) to (4):

(S-B)$_n$-X            Formula (2)

(S-B-S)            Formula (3)

(S-B-S-B3)            Formula (4)

wherein, S represents the polymer block (S) and B represents the polymer block (B); S and B in Formulae (1) to (4) may be the same or different, respectively; n in Formula (2) represents an integer of 2 or more; X represents a coupling residue; B3 in Formula (4) represents a polymer block (B3) comprising a conjugated diene compound unit as a main constituent, which is different from the polymer block (B); an amount of a vinyl bond of the polymer block (B3) before hydrogenation is 30 to 100 mol %; and a content of the polymer block (B3) in the hydrogenated block copolymer is 0.1 to 10% by mass.

3. The hydrogenated block copolymer according to claim 1, wherein the content of the structure represented by Formula (1) is 50 to 85% by mass.

4. A polypropylene-based resin composition comprising: 10 to 90% by mass of the hydrogenated block copolymer according to claim 1; and 10 to 90% by mass of a polypropylene-based resin.

5. The polypropylene-based resin composition according to claim 4, wherein the polypropylene-based resin is a random polypropylene.

6. A molded article comprising the polypropylene-based resin composition according to claim 4.

7. A sheet comprising the polypropylene-based resin composition according to claim 4.

8. A hydrogenated block copolymer comprising: a polymer block (S) comprising an aromatic vinyl compound unit as a main constituent; and a polymer block (B) comprising a conjugated diene compound unit as a main constituent, in a molecule, wherein
a content of the polymer block (S) is 5 to 20% by mass and a content of the polymer block (B) is 80 to 95% by mass, in the hydrogenated block copolymer, the polymer block (B) comprises a polymer block (B1) and a polymer block (B2);
an amount of a vinyl bond of the polymer block (B1) before hydrogenation is 40 to 60 mol % and an amount of a vinyl bond of the polymer block (B2) before hydrogenation is more than 60 to 100 mol %,
a content of the polymer block (B1) is 5 to 60% by mass and a content of the polymer block (B2) is 30 to 85% by mass, in the hydrogenated block copolymer,
a content of a structure represented by following Formula (1) in the hydrogenated block copolymer is 40 to 100% by mass:

(S-B)            Formula (1)

wherein, S represents the polymer block (S) and B represents the polymer block (B), and
a hydrogenation rate of the hydrogenated block copolymer is 70 mol % or more.

9. The hydrogenated block copolymer according to claim 8, wherein
a content of the structure represented by Formula (1) is 40 to 90% by mass, and
the hydrogenated block copolymer further comprises any one of structures represented by following formulae (2) to (4):

$(S-B)_n-X$      Formula (2)

$(S-B-S)$      Formula (3)

$(S-B-S-B3)$      Formula (4)

wherein, S represents the polymer block (S) and B represents the polymer block (B); S and B in Formulae (1) to (4) may be the same or different, respectively; n in Formula (2) represents an integer of 2 or more; X represents a coupling residue; B3 in Formula (4) represents a polymer block (B3) comprising a conjugated diene compound unit as a main constituent, which is different from the polymer block (B); an amount of a vinyl bond of the polymer block (B3) before hydrogenation is 30 to 100 mol %; and a content of the polymer block (B3) in the hydrogenated block copolymer is 0.1 to 10% by mass.

10. The hydrogenated block copolymer according to claim 8, wherein the content of the structure represented by Formula (1) is 50 to 85% by mass.

11. A polypropylene-based resin composition comprising: 10 to 90% by mass of the hydrogenated block copolymer according to claim 8; and 10 to 90% by mass of a polypropylene-based resin.

12. The polypropylene-based resin composition according to claim 11, wherein the polypropylene-based resin is a random polypropylene.

13. A molded article comprising the polypropylene-based resin composition according to claim 11.

14. A sheet comprising the polypropylene-based resin composition according to claim 11.

* * * * *